(12) United States Patent
Saito et al.

(10) Patent No.: US 10,938,119 B2
(45) Date of Patent: *Mar. 2, 2021

(54) WIRELESS COMMUNICATION DEVICE AND ANTENNA DEVICE

(71) Applicant: THE UNIVERSITY OF ELECTRO-COMMUNICATIONS, Tokyo (JP)

(72) Inventors: Akira Saito, Tokyo (JP); Kazuhiko Honjo, Tokyo (JP); Ryo Ishikawa, Tokyo (JP); Hiroto Otsuka, Tokyo (JP)

(73) Assignee: THE UNIVERSITY OF ELECTRO-COMMUNICATIONS, Choufu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/096,007

(22) PCT Filed: Apr. 24, 2017

(86) PCT No.: PCT/JP2017/016153
§ 371 (c)(1),
(2) Date: Feb. 15, 2019

(87) PCT Pub. No.: WO2017/188172
PCT Pub. Date: Nov. 2, 2017

(65) Prior Publication Data
US 2019/0252794 A1    Aug. 15, 2019

(30) Foreign Application Priority Data

Apr. 25, 2016 (JP) .............................. JP2016-087008

(51) Int. Cl.
*H01Q 19/17* (2006.01)
*H01Q 21/00* (2006.01)
(Continued)

(52) U.S. Cl.
CPC ............. *H01Q 19/17* (2013.01); *H01Q 1/52* (2013.01); *H01Q 7/00* (2013.01); *H01Q 19/185* (2013.01);
(Continued)

(58) Field of Classification Search
CPC ........ H01Q 19/17; H01Q 19/185; H01Q 1/52; H01Q 21/0006; H01Q 21/06; H01Q 7/00; H01Q 25/005; H01Q 5/40; H04B 7/04
See application file for complete search history.

(56) References Cited

U.S. PATENT DOCUMENTS 2,166,750 A * 7/1939 Carter ...................... H01Q 7/00
343/742
2,818,562 A * 12/1957 Carter .................... H01Q 21/08
343/742
(Continued)

FOREIGN PATENT DOCUMENTS

CN   103474777 A   12/2013
JP   09-260925 A   10/1997
(Continued)

OTHER PUBLICATIONS

Edfors, Ove et al., "Is Orbital Angular Momentum (OAM) Based Radio Communication an Unexploited Area?", IEEE Transactions on Antennas and Propagation, Feb. 2012, pp. 1126-1131, vol. 60, No. 2.
(Continued)

*Primary Examiner* — Hai V Tran
*Assistant Examiner* — Michael M Bouizza
(74) *Attorney, Agent, or Firm* — Sughrue Mion, PLLC

(57) ABSTRACT

A wireless communication apparatus includes a transmitting antenna; and a receiving antenna that receives a wireless signal transmitted from the transmitting antenna. Each of the transmitting antenna and the receiving antenna includes a
(Continued)

plurality of circular loop antennas arranged concentrically in an identical plane, each of the plurality of circular loop antennas having a loop perimeter approximately equal to an integer multiple of one wavelength determined from a frequency in a wireless communication; and a plurality of feeding sections individually connected with the plurality of circular loop antennas. A central axis of the plurality of circular loop antennas of the transmitting antenna and a central axis of the plurality of circular loop antennas of the receiving antenna are arranged approximately on a straight line. Thus, a wireless signal is transmitted between the circular loop antennas having a loop perimeter of a transmitting side and a receiving side.

6 Claims, 17 Drawing Sheets

(51) Int. Cl.
*H01Q 21/06* (2006.01)
*H01Q 7/00* (2006.01)
*H04B 7/04* (2017.01)
*H01Q 1/52* (2006.01)
*H01Q 19/185* (2006.01)
*H01Q 25/00* (2006.01)

(52) U.S. Cl.
CPC ......... *H01Q 21/0006* (2013.01); *H01Q 21/06* (2013.01); *H04B 7/04* (2013.01); *H01Q 25/005* (2013.01)

(56) References Cited

U.S. PATENT DOCUMENTS

| | | | |
|---|---|---|---|
| 5,625,371 A * | 4/1997 | Miller | H01Q 7/00 343/742 |
| 5,654,723 A * | 8/1997 | Craven | H01Q 7/00 343/742 |
| 6,057,803 A | 5/2000 | Kane et al. | |
| 9,755,323 B2 | 9/2017 | Li et al. | |
| 2015/0357710 A1 | 12/2015 | Li | |
| 2016/0028163 A1 | 1/2016 | Li et al. | |
| 2016/0041523 A1 | 2/2016 | Ashrafi et al. | |
| 2016/0197410 A1 | 7/2016 | Zheng et al. | |
| 2016/0359236 A1 | 12/2016 | Sundaram | |
| 2017/0117626 A1 | 4/2017 | Sajuyigbe et al. | |
| 2018/0287263 A1 | 10/2018 | Hirabe | |

FOREIGN PATENT DOCUMENTS

| | | |
|---|---|---|
| JP | 2015-231108 A | 12/2015 |
| WO | 2012/084039 A1 | 6/2012 |
| WO | 2014/199451 A1 | 12/2014 |
| WO | 2017/056136 A1 | 4/2017 |

OTHER PUBLICATIONS

Tamagnone, Michele et al., "The Orbital Angular Momentum (OAM) Multiplexing Controversy: OAM as a subset of MIMO", 2015 9th European Conference on Antennas and Propagation (EuCAP), Apr. 13, 2015, pp. 1-5.
International Search Report of PCT/JP2017/016153 dated Jul. 4, 2017 [PCT/ISA/210].

\* cited by examiner

WIRELESS COMMUNICATION DEVICE AND ANTENNA DEVICE

CROSS REFERENCE TO RELATED APPLICATIONS

This application is a National Stage of International Application No. PCT/JP2017/016153 filed Apr. 24, 2017, claiming priority based on Japanese Patent Application No. 2016-087008 filed Apr. 25, 2016.

TECHNICAL FIELD

The present invention relates to a wireless communication apparatus and an antenna apparatus, and especially, to a wireless communication apparatus that can execute wireless communication of data of a plurality of sequences at a same time while using an identical frequency band, and an antenna apparatus used for the wireless communication apparatus.

BACKGROUND ART

Recent years, by the popularity of abundant contents on the Internet, a high-speed network by use of a light channel and a wireless network to the last user, the progress to the advanced informative society which makes the provision of the information matching to the needs of the individual such as "always, anywhere, and anyone" and "only now, only here, only you" possible is moving ahead rapidly. Also, the collection of the big data by communication using a sensor network without human intervention advances. As a wireless system to support these, there are provided with various systems such as mobile phone, Wimax (Worldwide Interoperability for Microwave Access), wireless LAN (Local Area Network), Bluetooth (registered trademark), UWB (Ultra Wide Band), and ZigBee.

In addition, a service provided by connecting these systems seamlessly and combining the systems is developing. These wireless systems occupy a peculiar communication band to carry out communication. Especially, to transmit a great deal of data at high speed, a wide frequency band must be used. Thus, the frequency resources as valuable resources are needed. Therefore, as an index of the effective use of the frequency band, a transmission rate (bit/Hz) per frequency which is calculated by dividing a transmission data amount by the bandwidth is used, and the importance of the technique of improving the index is increasing.

As one of the techniques which can improve the transmission rate per frequency, the technique called MIMO (multiple-input and multiple-output) is known in which a plurality of antennas are arranged in a transmission side and a receiving side. MIMO is the technique of spatial multiplexing by utilizing the difference of the propagation characteristic in the same time in the same band. For example, when each of the transmitting side and the receiving side has n antennas (n is an optional integer), the voltage-current relation in the transmitting antenna and the voltage-current relation in the receiving antenna can be determined uniquely by using a transfer function (e.g. a Z matrix) of a propagation route. The matrix is expressed as a square matrix of n rows×n columns.

Using an eigenvector of this matrix, the square matrix of the n rows×n columns can be diagonalized, and the transfer function of the n eigenvectors becomes independent. Therefore, the n-fold multiplexing becomes possible. However, in MIMO, there has been a problem that complicated signal processing becomes necessary because mixed signals should be separated mathematically. In addition, there has been another problem that the system configuration becomes complicated, because a plurality of antennas should operate cooperatively.

Under such a situation, recent years, as a technique of multiplexing in an identical frequency, OAM (Orbital Angular Momentum) communication is proposed. This technique utilizes a phenomenon that interaction is permissible only when an orbital angular momentum of electromagnetic field is conserved, and is a technique of multiplexing communication by placing separate data in each mode of the electromagnetic wave modes having discrete orbital angular momentum (OAM).

For the waves such as a laser beam, of which spatial distribution is Gaussian in the cross section, spatial distribution of the phase on an orientation (φ) in the cross section is usually constant. On the other hand, in the OAM wave, the phase changes linearly to the orientation φ according to exp (jmφ) (m is an order of mode for the OAM wave and is called a magnetic quantum number) so that the phase-front advances spirally. Such OAM wave can be realized relatively easily in case of optical communication by using a laser and a hologram or a spiral phase plate. On the other hand, in case of microwave communication, because a transmitting method and a receiving method of an eigen mode, and a transmitting method of a collimated beam are different greatly from the methods for the optical communication, the realization of the OAM wave is not easy.

For example, in Patent Literature 1, so as to imitate the configuration of carrying out OAM communication by using light, the technique of generating OAM wave in electromagnetic wave is described in a configuration of putting notches spirally into a parabolic antenna, and shifting a reflection surface by an integer multiple of one wavelength.

Also, in Patent Literature 2, a technique is disclosed of arranging an array of antenna devices on a circumference and shifting a phase in a constant interval among the antenna devices so that an electromagnetic field in which the phase-front changes according to exp (jmφ) is generated on a circumference at the receiving position. In this technique, by discretely changing a phase shift quantity, a different OAM mode is generated and multiplexing is carried out among the modes.

CITATION LIST

Patent Literature

[Patent Literature 1] WO 2014/199451A
[Patent Literature 2] JP 2015-231108A

SUMMARY OF THE INVENTION

As described in Patent Literature 1, the OAM wave can be generated by putting a notch into the parabolic antenna in a spiral manner and shifting a reflection surface by an integer multiple of the wavelength.

However, there is a problem that it is not easy to manufacture a parabolic antenna of the special shape with the notch and the mass production is difficult.

Also, as disclosed in Patent Literature 2, in case of configuration in which antenna devices in an array are arranged on a circumference, like a case of the general MIMO communication, the complicated signal processing becomes necessary to extract signals in each mode from the correlation between reception signals by the antennas.

Moreover, phase shifters are required on the transmitting side to give a constant phase difference between the antennas, which is indispensable to produce the rotating phasefront of exp (jmφ) for the electromagnetic field. Therefore, in case of the configuration in which the antenna devices in an array are arranged on the circumference, there is a problem that the configuration of the transmitter and the receiver becomes very complicated.

In this way, the conventionally proposed technique of improving the transmission rate per frequency has the problem that the complicated antenna becomes necessary and the problem that the transmitter and the receiver of complicated configuration become necessary. It is demanded to improve a transmission rate per frequency in a simpler configuration.

An object of the present invention is to provide a wireless communication apparatus and an antenna apparatus, in which the transmission rate per frequency can be improved in a simple configuration.

The wireless communication apparatus of the present invention includes: transmitting antennas; and receiving antennas that receive wireless signals transmitted from the transmitting antennas.

Each of the transmitting antenna array and the receiving antenna array includes: a plurality of circular loop antennas arranged concentrically in an identical plane, each of the plurality of circular loop antennas having a loop perimeter approximately equal to an integer multiple of a wavelength determined from a frequency in a wireless communication; and a plurality of feeding sections respectively connected with the plurality of circular loop antennas.

A central axis of the plurality of circular loop antennas of the transmitting antenna and a central axis of the plurality of circular loop antennas of the receiving antenna are arranged approximately on a straight line.

Also, the antenna apparatus of the present invention includes: a plurality of circular loop antennas arranged concentrically in an identical plane, each of the plurality of circular loop antennas having a loop perimeter approximately equal to an integer multiple of a wavelength determined from a frequency in a wireless communication; and a plurality of feeding sections individually connected with the plurality of circular loop antennas. Transmitting sections or receiving sections are connected with the plurality of feeding sections.

According to the present invention, a wireless communication can be realized which improves a transmission rate per frequency by using the antenna apparatus which is cheap and excellent on the mass production because of the simple structure. Moreover, in case of the present invention, because an additional special configuration for separation and mixing of signals of a plurality of sequences is not needed for the transmitting sections and the receiving sections which are connected with the antenna apparatus, the wireless communication to improve a transmission rate per frequency becomes possible in a simple configuration as the whole wireless communication apparatus.

BRIEF DESCRIPTION OF THE DRAWINGS

FIG. 14B shows an example of insertion loss between a transmitting side and a receiving side, in which the port directions are directed in a same direction.

FIG. 15B shows an example of insertion loss between the transmitting side and the receiving side when the port directions are shifted.

DESCRIPTION OF EMBODIMENTS

Hereinafter, embodiments of the present invention (hereinafter, to be called "present examples") will be described with reference to FIG. 1 to FIG. 7F.

[1. Configuration of Whole System]

Figure 1:
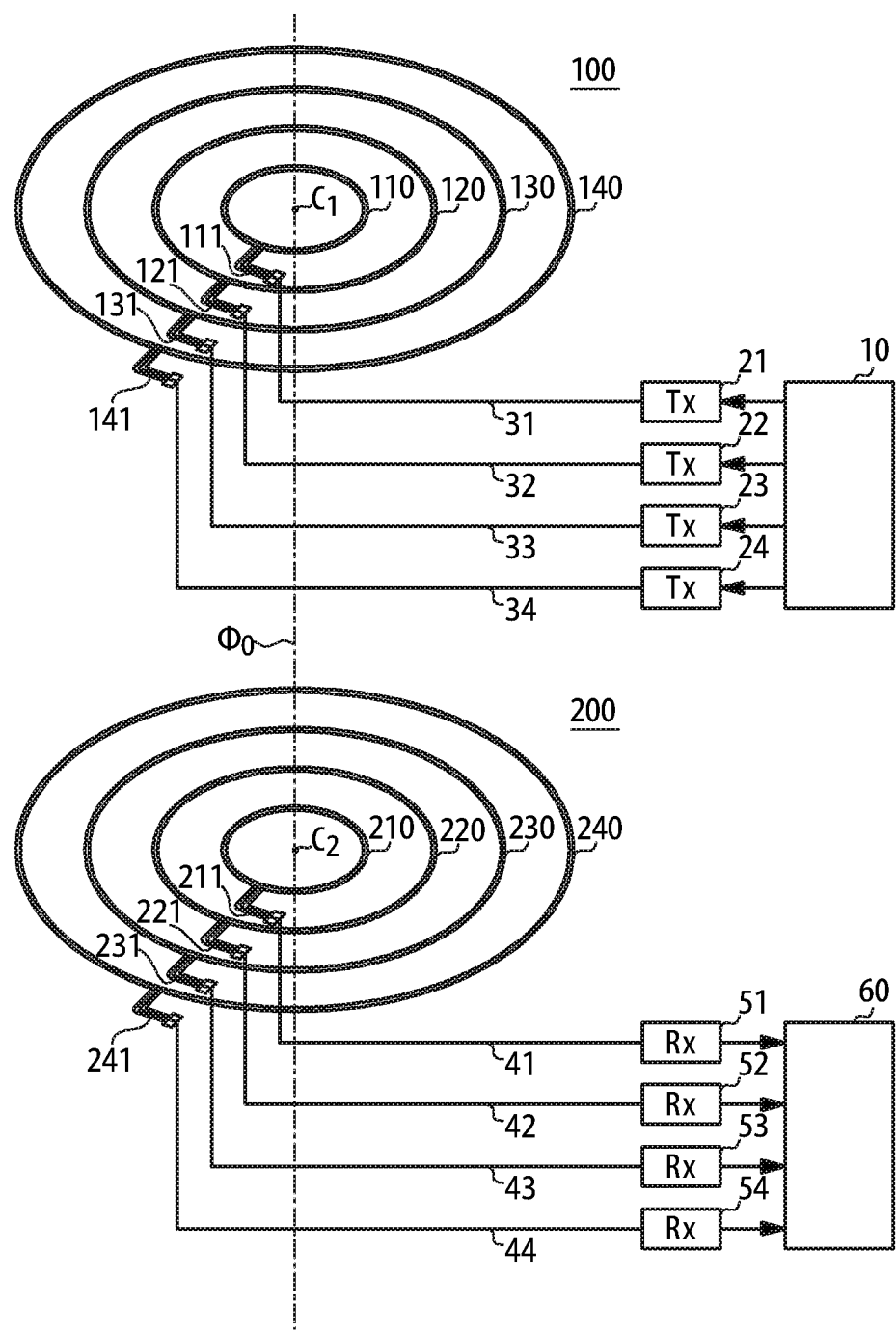
FIG. 1 is a diagram showing a configuration example of a wireless communication apparatus according to an embodiment of the present invention.

FIG. 1 is a diagram showing a configuration example of whole wireless communication apparatus according to a present example.

The wireless communication apparatus of the present example is used to carry out wireless communication from a transmitting antenna array 100 to a receiving antenna array 200 in a relatively short range. The transmitting antenna array 100 and the receiving antenna array 200 have an identical configuration, and each of the antenna arrays has a plurality (four in this case) of circular loop antennas 110 to 140 or 210 to 240.

That is, the transmitting antenna array 100 has four circular loop antennas 110, 120, 130 and 140. These four circular loop antennas 110, 120, 130 and 140 are arranged in an identical plane to have a same central position $c_1$.

Also, the receiving antenna array 200 has four circular loop antennas 210, 220, 230 and 240. The four circular loop antennas 210, 220, 230 and 240 are arranged in an identical plane to have a same central position $c_2$.

Note that each of the circular loop antennas 110 to 140 and 210 to 240 in the present example is formed from a circular conductor, ends (terminals) of which are separated at a feeding section, as mentioned later. Thus, the conductor is not connected annularly (reference to FIG. 3).

Each of the circular loop antennas 110 to 140 and 210 to 240, which configure the transmitting antenna array 100 and the receiving antenna array 200, is isolated from others, and has a loop perimeter approximately equal to (corresponding to) an integer multiple of one wavelength determined based on a frequency of wireless communication by the wireless communication apparatus of the present example. The details of the loop perimeter of each circular loop antenna 110 to 140 and 210 to 240 will be described later.

As shown in FIG. 1, the central axis $\phi_0$ to have extended the central position $c_1$ of the transmitting antenna array 100 into a direction orthogonal to the circular loop antennas 110 to 140 passes through the central position $c_2$ of the receiving antenna array 200. That is, the transmitting antenna array 100 and the receiving antenna array 200 are arranged so that these central axes $\phi_0$ are approximately coincident.

For example, a distance between the transmitting antenna array 100 and the receiving antenna array 200 is set to a relatively short distance in a range of 0.5 cm to about tens of cm.

The configuration of the transmitting side will be described. A data generating section 10 for transmission generates four kinds of transmitting data sequences, and supplies the four sequences to four transmitting sections 21, 22, 23 and 24. Each of the transmitting sections 21, 22, 23 and 24 generates transmission wave by modulating carrier wave of an identical communication frequency with a corresponding one of the transmission data sequences. The transmission waves obtained from the transmitting sections 21, 22, 23 and 24 are supplied to the feeding sections 111, 121, 131 and 141 which are connected with the four circular loop antennas 110, 120, 130 and 140 through signal lines 31, 32, 33 and 34.

The four circular loop antennas 110, 120, 130 and 140 carry out the wireless transmission using the transmission waves supplied to the feeding sections 111, 121, 131 and 141.

Signals transmitted in wireless from the four circular loop antennas 110, 120, 130 and 140 are respectively received by the four circular loop antennas 210, 220, 230 and 240 of the receiving antenna array 200. The four circular loop antennas 210, 220, 230 and 240 have feeding sections 211, 221, 231 and 241. Reception waves acquired by the feeding sections 211, 221, 231 and 241 are supplied to the receiving sections 51, 52, 53 and 54 through signal lines 41, 42, 43 and 44. The receiving sections 51, 52, 53 and 54 demodulate the signals on the carrier waves of the same frequency to acquire received data sequences. The received data sequences obtained by the receiving sections 51, 42, 53, 54 are supplied to a data processing section 60.

[2. Configuration of Antenna Apparatus]

Figure 2:
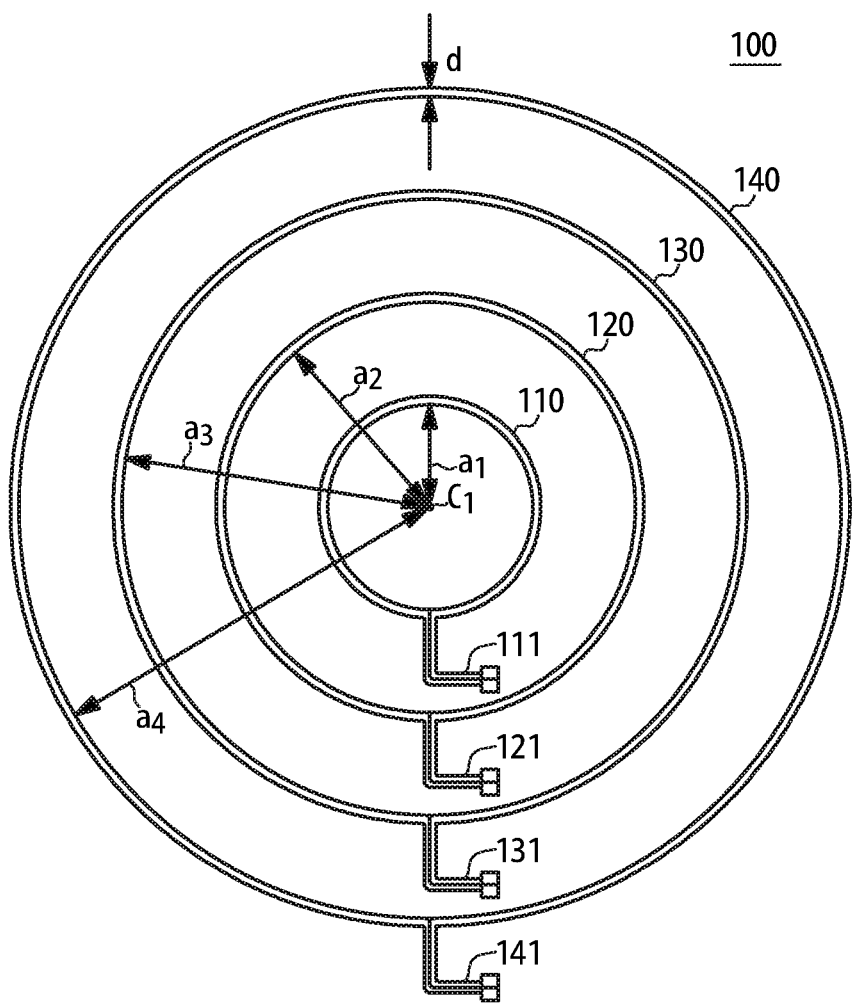
FIG. 2 is a plan view showing an antenna configuration according to an embodiment of the present invention.
Figure 3:
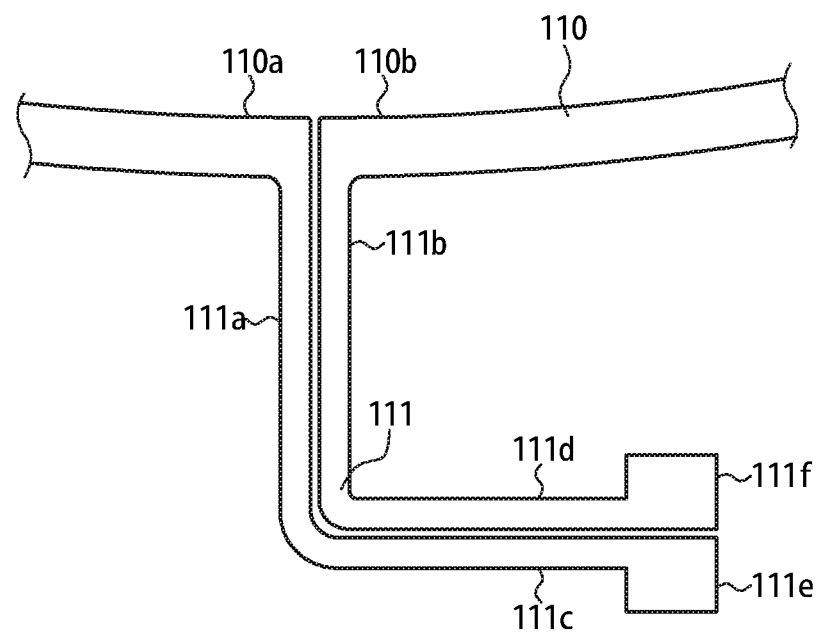
FIG. 3 is an expanded plan view showing the neighborhood of a feeding section of an antenna according to an embodiment of the present invention.

FIG. 2 and FIG. 3 show the configuration of the transmitting antenna array 100. Since the receiving antenna array 200 has the same configuration as the transmitting antenna array 100, the description using FIG. 2 and FIG. 3 is applied to the receiving antenna array 200.

As shown in FIG. 2, the four circular loop antennas 110, 120, 130 and 140 of the transmitting antenna array 100 are arranged concentrically. The loop perimeter of a conductor of each of the circular loop antennas 110, 120, 130 and 140 is set to a length approximately equal to (corresponding to) an integer multiple of one wavelength determined based on the frequency of the transmission signal.

That is, when the wavelength of wireless transmission wave is $\lambda$, the loop perimeter showing a whole length of the circular loop antenna 110, 120, 130 and 140 is set to be approximately equal to an integer multiple of one wavelength $\lambda$. In other words, radii from the center $c_1$ of the concentric circles to the conductors of the circular loop antennas 110, 120, 130 and 140 are $a_1, a_2, a_3$ and $a_4$, and the radii $a_1$ to $a_4$ are shown as $a_i$ (i is an integers of 1 to 4). In this case, the radius $a_i$ of each circular loop antenna 110 to 140 is shown by the following equation (1).

$$a_i = \frac{n_i \lambda}{2\pi} \qquad \text{Equation (1)}$$

Here, $n_i$ is an optional natural number and is a natural number of a value which is different for each of the circular loop antennas 110 to 140.

When each of the circular loop antennas 110, 120, 130 and 140 is arranged as shown in FIG. 2, the innermost circular loop antenna 110 has the smallest loop perimeter, and the outermost circular loop antenna 140 has the largest loop perimeter. In other words, $n_i$ is the natural numbers, which increase in order from the innermost loop to the outermost loop, such as 1, 2, 3 and 4. Here, whereas the above continuous integral numbers are an example increasing one by one, the numbers may increase two by two.

When the circular loop antennas 110, 120, 130 and 140 are arranged on a dielectric substrate, because the wavelength is reduced based on an effective dielectric constant $\varepsilon_e$ which is determined based on the permittivity of the dielectric substrate, the radius $a_i$ of each circular loop antenna 110 to 140 is shown by the following equation (2).

$$a_i = \frac{n_i \lambda}{2\pi \varepsilon_e} \qquad \text{Equation 2}$$

Also, it is desirable that the conductor width d of each of the circular loop antennas 110, 120, 130 and 140 is equal to or less than 1/10 of the loop radius. For example, the conductor widths d of the circular loop antennas 110, 120, 130 and 140 are set to optional values equal to or less than 1/10 of the radius of the innermost circular loop antenna 110. Or, the conductor width d may be equal to or less than 1/10 of the radius of each of the circular loop antennas 110 to 140, and may be set to be wider for the outer circumference.

FIG. 3 is an expanded diagram showing the detailed configuration of the feeding section 111 which is an embodiment of balun connected with the circular loop antenna 110.

One end (port) 110a and the other end (port) 110b of the circular loop antenna 110 are arranged closely in an electrically non-conductive state. Linear coupled lines 111a and 111b are connected with the one end 110a and the other end 110b. The coupled lines 111a and 111b are connected with coupled lines 111c and 111d arranged to be orthogonal to the coupled lines 111a and 111b. Pads 111e and 111f are formed at ends of the coupled lines 111c and 111d.

Differential signals are supplied to two pads 111e and 111f from the transmitting section 21 shown in FIG. 1.

The feeding section 111 having a configuration shown in FIG. 3 functions as a balun which carries out real impedance conversion. By the feeding section 111 having the function as the balun, for example, the input impedance of the circular loop antenna 110 can be adjusted to 50Ω which is the characteristic impedance of a coaxial cable.

The feeding sections 121, 131 and 141 connected with the other circular loop antennas 120, 130 and 140 of the transmitting antenna array 100 has the similar configuration to the feeding section 111 shown in FIG. 3. Differential signals are supplied from the transmitting sections 22, 23 and 24 corresponding to the feeding sections 121, 131 and 141.

Also, the feeding sections 211, 221, 231 and 241 connected with the circular loop antennas 210, 220, 230 and 240 of the receiving antenna array 200 have the similar configuration to the feeding section 111 shown in FIG. 1. That is, a differential signal received by each of the circular loop antennas 210, 220, 230 and 240 is acquired on pads (which have the same configuration as the pads 111e and 111f shown in FIG. 3) of a corresponding one of the feeding section 211, 221, 231 and 241, and supplied to a corresponding one of the receiving sections 51, 52, 53 and 54. Although an embodiment of the balun has been shown, the balun used in this embodiment is not limited to the above configuration and may have an optional configuration as long as having the function of balun.

[3. Operation Characteristics of Antenna Apparatus]

Next, the operation characteristics of the transmitting antenna array 100 and the receiving antenna array 200 will be described.

First, characteristics of the individual bodies of the circular loop antennas 110 to 140 and 210 to 240 will be described.

Figure 4:
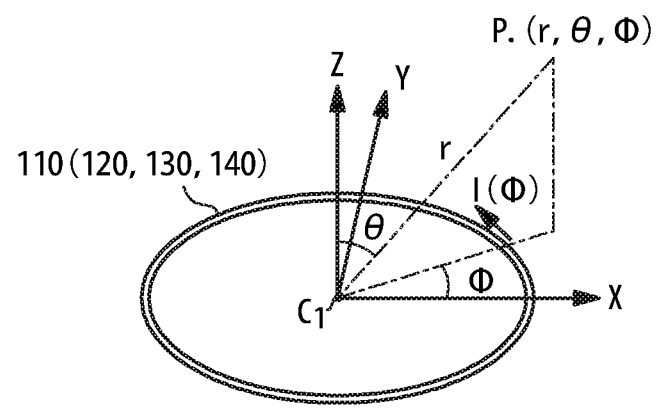
FIG. 4 is a diagram showing a current distribution in a loop antenna according to an embodiment of the present invention and an observation point of an electromagnetic field in a polar coordinate system.

As shown in FIG. 4, when one circular loop antenna 110 (or, any one of 120, 130 and 140) is arranged on the XY plane prescribed by the X axis and the Y axis, a current distribution I(φ) on the circular loop antenna 110 is shown by the following equation (3) through the Fourier series expansion.

$$I(\phi) = I_0 + 2\sum_{n=1}^{\infty} I_n \cos(n\phi) \quad \text{Equation (3)}$$

An example of calculation of the current distribution when the loop perimeter (the circumference length) of the circular loop antenna is an integer multiple of one wavelength is shown in each of FIG. 5A to FIG. 5F based on this equation (3).

Figure 5A:
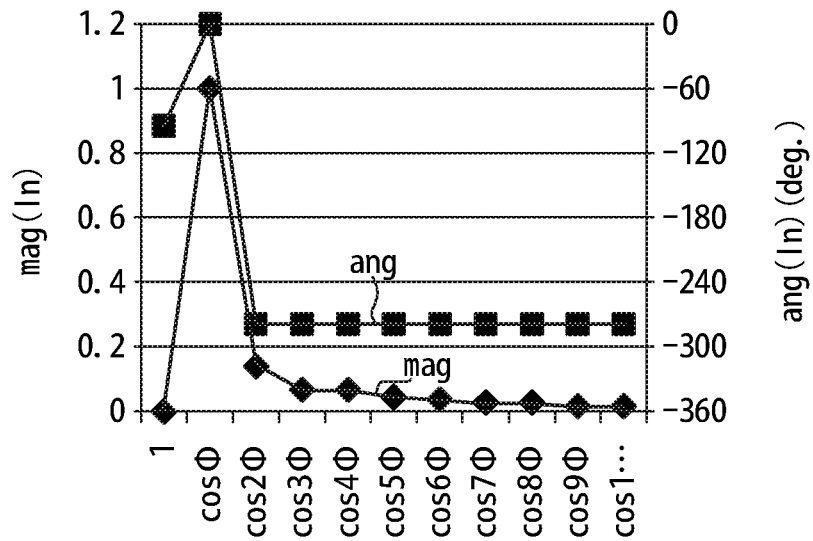
FIG. 5A, FIG. 5B, FIG. 5C, FIG. 5D, FIG. 5E and FIG. 5F are characteristic diagrams, and each of FIG. 5A to FIG. 5F shows a relation of a loop perimeter of a loop antenna and Fourier expansion coefficients of a current distribution in an embodiment of the present invention.
Figure 5B:
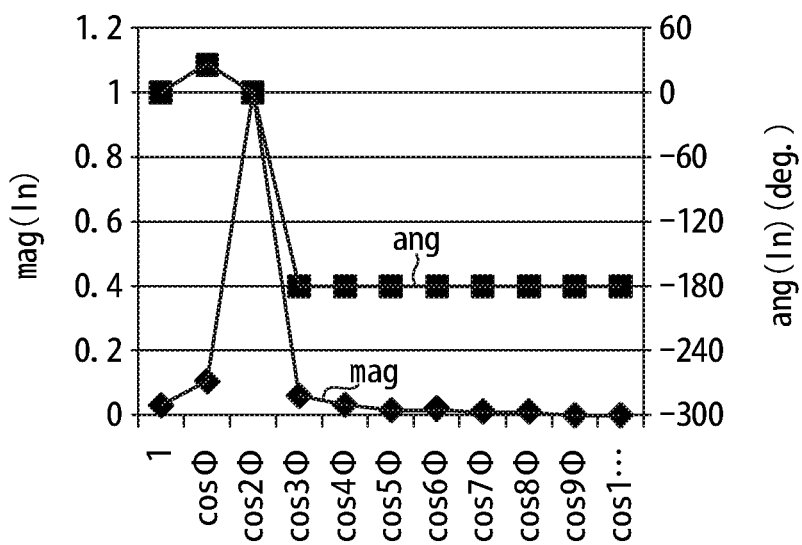
Figure 5C:
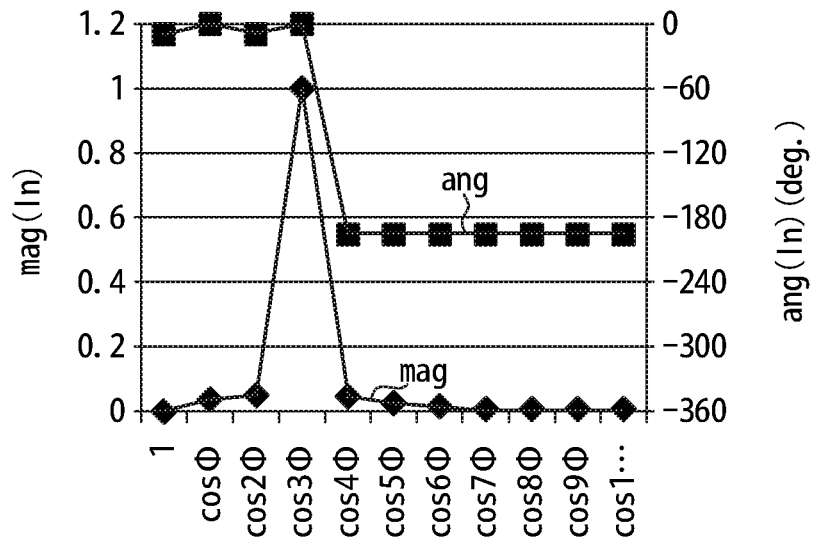
Figure 5D:
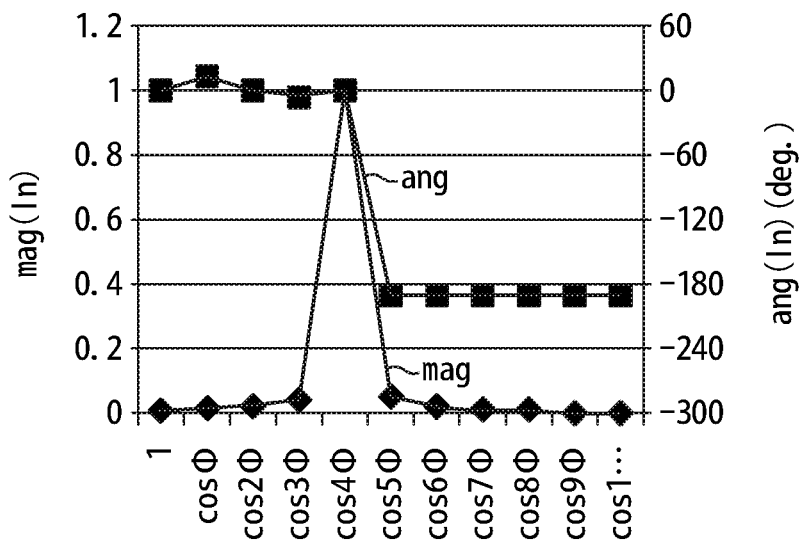
Figure 5E:
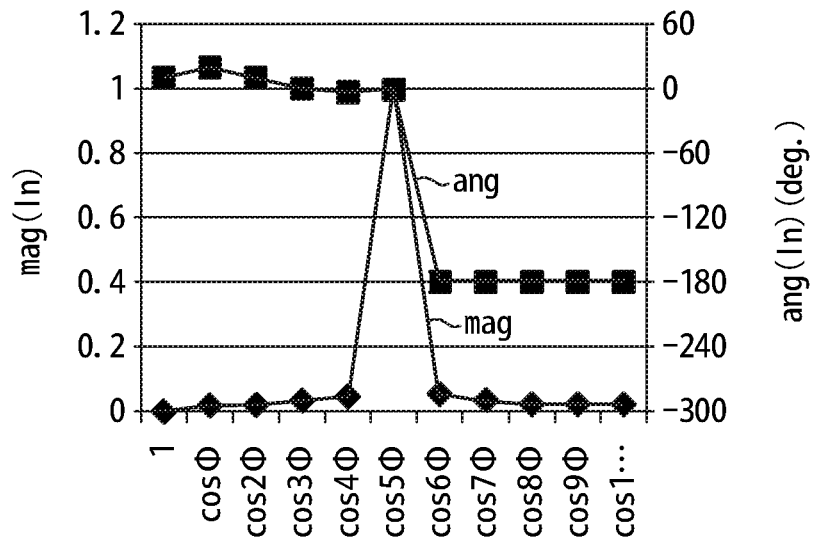
Figure 5F:
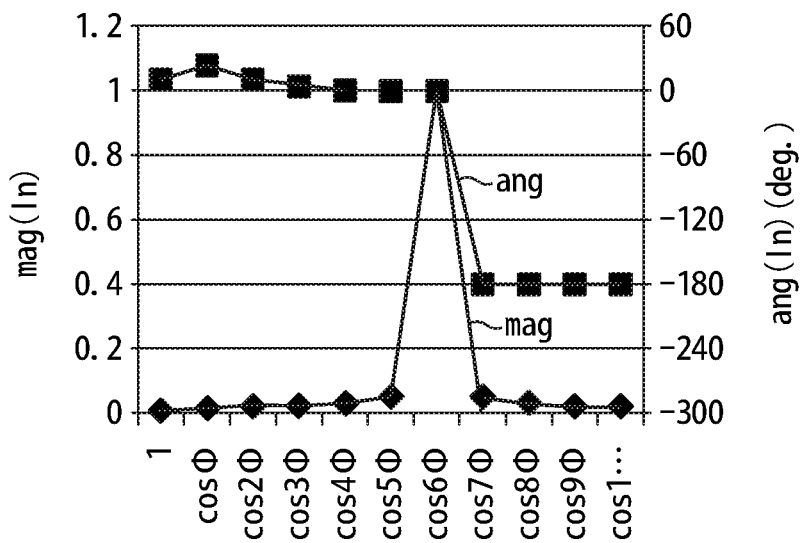

In this case, an example is shown in which the loop perimeter of the circular loop antenna is:
1 time of one wavelength (FIG. 5A);
2 times of one wavelength (FIG. 5B);
3 times of one wavelength (FIG. 5C);
4 times of one wavelength (FIG. 5D);
5 times of one wavelength (FIG. 5E); and
6 times of one wavelength (FIG. 5F).

In FIG. 5A to FIG. 5F, [mag] shows amplitude and [ang] shows phase.

In case that the loop perimeter is n wavelengths, the expansion coefficient for cos(nφ) is overwhelmingly large and the other coefficients are greatly small. Specifically, the ratio of the coefficients $I_{n\pm1}$ adjacent to the expansion coefficient $I_n$ to the expansion coefficient $I_n$ is equal to or less than −16 dB. This shows a current distribution in which current approximately proportional to cos(nφ) flows through the circular loop antenna, when the loop perimeter is approximately equal to n wavelengths.

The electromagnetic field at P point (FIG. 4) of the circular loop antenna having such a current distribution can be expanded using eigenmodes of the wave equation with reference to the scheme of the Green's function, and can be determined from the following equation (4) and the following equation (5). In the equation (4) and the equation (5), E shows an electric field and H shows a magnetic field. The suffixes r, θ, and φ show axial components of data on the polar coordinates. Also, $\eta_0$ is wave impedance in a free space, $k_0$ is a wave number in free space, l is an orbital angular momentum quantum number, and m is a magnetic quantum number. Here, the orbital angular momentum quantum number l is a natural number, and the magnetic quantum number m is allowed to take 0 or a negative integer, and the absolute value of the number m is equal to or less than l.

$h_1^{(2)}$ (x) is the $1^{th}$-order second-kind spherical Hankel function, $j_1(x)$ is the $1^{th}$-order spherical Bessel function, and $p_1^m$ (x) shows the (1, m)$^{th}$-order associated Legendre function. $I_m$ is a Fourier expansion coefficient relating to cos(mφ) of the current distribution.

The equation (4) expresses a case where l+m is even (in case of TM wave) and the equation (5) is expresses where l+m is odd (in case of TE wave).

$$\begin{bmatrix} E_r \\ E_\theta \\ E_\phi \end{bmatrix} = \frac{\eta_0 k_0}{4} \sum_{l=1}^{\infty} \sum_{m=0}^{l} \frac{2l+1}{l(l+1)} \frac{(l-m)!}{(l+m)!} \cdot I_m(1+\delta_{m,0}) \times \quad \text{Equation (4)}$$

$$\left[ \pm \frac{1}{k_0} \frac{d(rj_l(k_0 r))}{d_r} \bigg|_{r=a} \cdot m P_l^m(0) \right]$$

$$\begin{bmatrix} \frac{l(l+1)}{k_0 r} h_l^{(2)}(kr) \cdot P_l^m(\cos\theta)\sin m\phi \\ \frac{1}{k_0 r} \frac{d\{rh_l^{(2)}(k_0 r)\}}{dr} \cdot \frac{dP_l^m(\cos\theta)}{d\theta}\sin m\phi \\ \mp \frac{1}{k_0 r} \frac{d\{rh_l^{(2)}(k_0 r)\}}{dr} \cdot \frac{m}{\sin\theta} P_l^m(\cos\theta)\cos m\phi \end{bmatrix}$$

$$\begin{bmatrix} H_r \\ H_\theta \\ H_\phi \end{bmatrix} = \frac{jk_0^2}{4} \sum_{l=1}^{\infty} \sum_{m=0}^{l} \frac{2l+1}{l(l+1)} \frac{(l-m)!}{(l+m)!}$$

$$I_m(1+\delta_{m,0}) \left[ \frac{1}{k_0} \frac{d(rj_l(k_0 r))}{d_r} \bigg|_{r=a} \cdot \right.$$

$$m P_l^m(0) \begin{bmatrix} 0 \\ -h_l^{(2)}(kr) \cdot \frac{m}{\sin\theta} P_l^m(\cos\theta)\cos m\phi \\ \mp h_l^{(2)}(kr) \cdot \frac{dP_l^m(\cos\theta)}{d\theta}\sin m\phi \end{bmatrix}$$

-continued $$\begin{bmatrix} E_r \\ E_\theta \\ E_\phi \end{bmatrix} = \frac{\eta_0 k_0}{4} \sum_{l=1}^{\infty} \sum_{m=0}^{l} \frac{2l+1}{l(l+1)} \frac{(l-m)!}{(l+m)!} \cdot I_m(1+\delta_{m,0}) \times$$

$$\left[ aj_l(k_0 a) \cdot \frac{dP_l^m(\cos\theta)}{d\theta} \right]_{\theta=\pi/2}$$

$$\begin{bmatrix} 0 \\ \mp h_l^{(2)}(kr) \cdot \frac{m}{\sin\theta} P_l^m(\cos\theta)\sin m\phi \\ -h_l^{(2)}(kr) \cdot \frac{dP_l^m(\cos\theta)}{d\theta}\cos m\phi \end{bmatrix}$$

Equation (5)

$$\begin{bmatrix} H_r \\ H_\theta \\ H_\phi \end{bmatrix} = \frac{jk_0^2}{4} \sum_{l=1}^{\infty} \sum_{m=0}^{l} \frac{2l+1}{l(l+1)} \frac{(l-m)!}{(l+m)!} I_m(1+\delta_{m,0}) \times$$

$$\left[ -aj_l(k_0 a) \cdot \frac{dP_l^m(\cos\theta)}{d\theta} \right]_{\theta=\pi/2}$$

$$\begin{bmatrix} -\frac{l(l+1)}{k_0 r} h_l^{(2)}(kr) \cdot P_l^m(\cos\theta)\cos m\phi \\ -\frac{1}{k_0 r} \frac{d\{rh_l^{(2)}(k_0 r)\}}{dr} \cdot \frac{dP_l^m(\cos\theta)}{d\theta}\cos m\phi \\ \pm \frac{1}{k_0 r} \frac{d\{rh_l^{(2)}(k_0 r)\}}{dr} \cdot \frac{m}{\sin\theta} P_l^m(\cos\theta)\sin m\phi \end{bmatrix}$$

From the equation (4) and the equation (5), when the expansion coefficient of the current distribution is large only when m=n, a summation relating to m in the equation (4) and the equation (5) can be approximated only by the term of m=n. Therefore, the electromagnetic field radiated from the loop antenna in which the loop perimeter is the n wavelengths (n=1, 2, 3, 4 in FIG. 1) in the mode of m=n is dominant. Thus, the electromagnetic field can be approximated as the unique $n^{th}$-order mode with respect to the magnetic quantum number m by ignoring the other modes.

In this example, the current distribution can be expressed by a linear combination of ±m modes in the OAM mode. For example, if divided into the terms of +m and −m in the TM wave, the following equation (6) is obtained. In an upper part of equation (6), m is 0 or a positive integer, and in the lower part thereof, m is 0 or negative. Depending on exp (jmφ), the OAM mode is established in which the phase rotates in a space according to φ. That is, the OAM wave is generated without using any phase shifter.

$$\begin{bmatrix} E_r \\ E_\theta \\ E_\phi \end{bmatrix} = \frac{\eta_0 k_0}{4} \sum_{l=1}^{\infty} \sum_{m=0}^{l} \frac{2l+1}{l(l+1)} \frac{(l-m)!}{(l+m)!} \cdot I_m(1+\delta_{m,0}) \times$$

Equation (6)

$$\left[ \pm \frac{1}{k_0} \frac{d(rj_l(k_0 r))}{d_r} \right]_{r=a} \cdot mP_l^{|m|}(0)$$

$$e^{jm\phi} \begin{bmatrix} -j\frac{l(l+1)}{2k_0 r} h_l^{(2)}(kr) \cdot P_l^{|m|}(\cos\theta) \\ \frac{-j}{2k_0 r} \frac{d\{rh_l^{(2)}(k_0 r)\}}{dr} \cdot \frac{dP_l^{|m|}(\cos\theta)}{d\theta} \\ \frac{1}{2k_0 r} \frac{d\{rh_l^{(2)}(k_0 r)\}}{dr} \cdot \frac{m}{\sin\theta} P_l^{|m|}(\cos\theta) \end{bmatrix} +$$

$$\frac{\eta_0 k_0^2}{4} \sum_{l=1}^{\infty} \sum_{m=0}^{l} \frac{2l+1}{l(l+1)} \frac{(l-m)!}{(l+m)!} \cdot I_m(1+\delta_{m,0}) \times$$

$$\left[ \frac{-1}{k_0} \frac{d(rj_l(k_0 r))}{d_r} \right]_{r=a} \cdot mP_l^{|m|}(0)$$

$$e^{jm\phi} \begin{bmatrix} -j\frac{l(l+1)}{2k_0 r} h_l^{(2)}(kr) \cdot P_l^{|m|}(\cos\theta) \\ \frac{-j}{2k_0 r} \frac{d\{rh_l^{(2)}(k_0 r)\}}{dr} \cdot \frac{dP_l^{|m|}(\cos\theta)}{d\theta} \\ \frac{1}{2k_0 r} \frac{d\{rh_l^{(2)}(k_0 r)\}}{dr} \cdot \frac{m}{\sin\theta} P_l^{|m|}(\cos\theta) \end{bmatrix}$$

Also, when such an electromagnetic field is input to the receiving antenna array 200 which is coincident in the central axis $\phi_0$ with the transmitting antenna array 100, as shown in FIG. 1, the received current, of which Fourier expansion coefficient is only $I_n$, appears dominantly, considering the reciprocity theorem of the electromagnetism. Therefore, when the electromagnetic fields are radiated from the plurality of circular loop antennas 110, 120, 130 and 140, in which the loop perimeters are different from each other and each of which is the integral multiple of one wavelength, as shown in FIG. 1, the electromagnetic fields are radiated which have an integer-order magnetic quantum numbers determined based on the loop perimeters of the circular loop antennas 110, 120, 130 and 140. The electromagnetic field is mixed fields for various order modes.

When the receiving antenna array 200 is arranged to be coincident, in the central axis $\phi_0$ with the transmitting antenna array 100, each of the circular loop antennas 210, 220, 230 and 240 of the receiving antenna array 200 receives selectively and exclusively an electromagnetic field component which has the magnetic quantum number determined based on the loop perimeter. As a result, only the current of cos(nφ) corresponding to the order n equal to the magnetic quantum number is greatly excited in each circular loop antenna 210, 220, 230 and 240. In other words, the electromagnetic wave transmitted from one circular loop antenna on the transmitting side is received in a high sensitivity by the circular loop antenna of the same loop perimeter on the receiving side, and signals are received only in a very low level between the circular loop antennas having different loop perimeters. Therefore, even if different wireless signals of the same frequency are transmitted from the circular loop antennas having different loop perimeters, the wireless communication of the different signals can be realized simultaneously by using the same frequency. Thus, a transmission rate per frequency can be improved greatly.

Note that the radiation intensity from each of the circular loop antennas 110 to 140 is determined depending on an orientation, and especially, the region with a large intensity is not in a front direction for the orders of magnetic quantum number m excluding $0^{th}$-order.

Figure 6A:
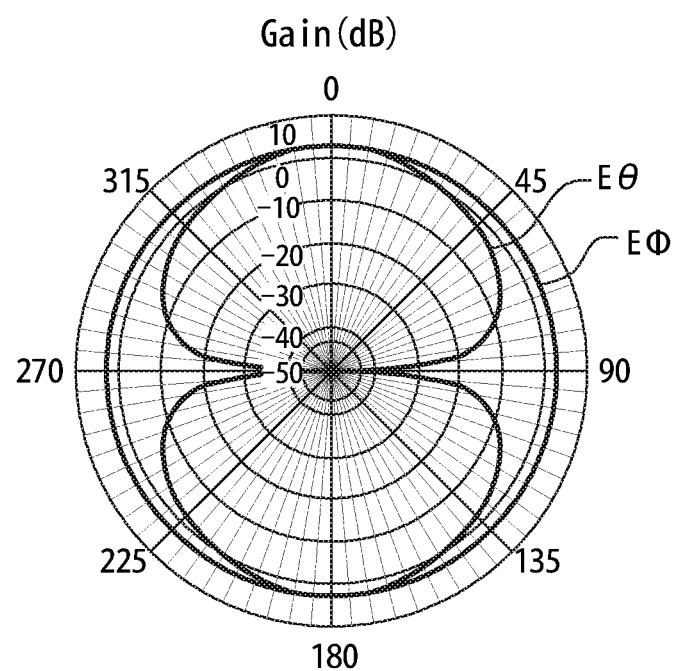
FIG. 6A, FIG. 6B, and FIG. 6C are characteristic diagrams, and each of FIG. 6A to FIG. 6C shows an example of far field radiation pattern of an (l, m)-order mode of an orbital angular momentum quantum number l and a magnetic quantum number m in an embodiment of the present invention.
Figure 6B:
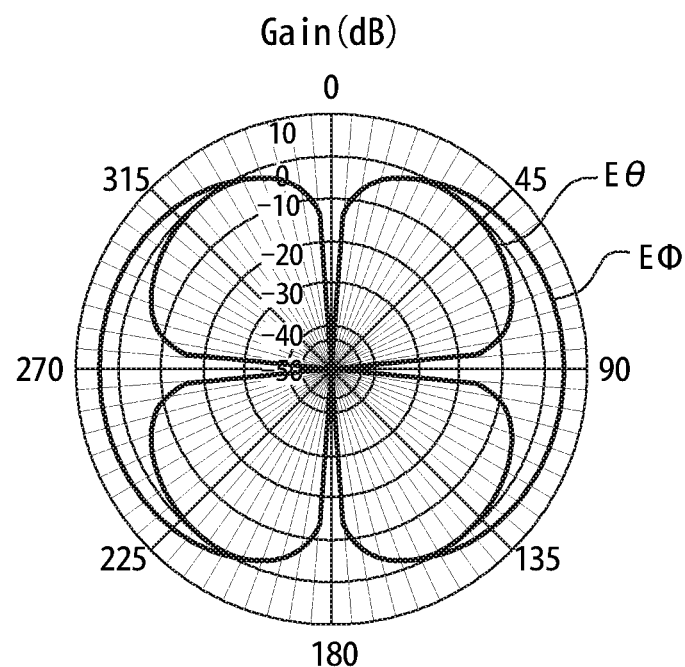
Figure 6C:
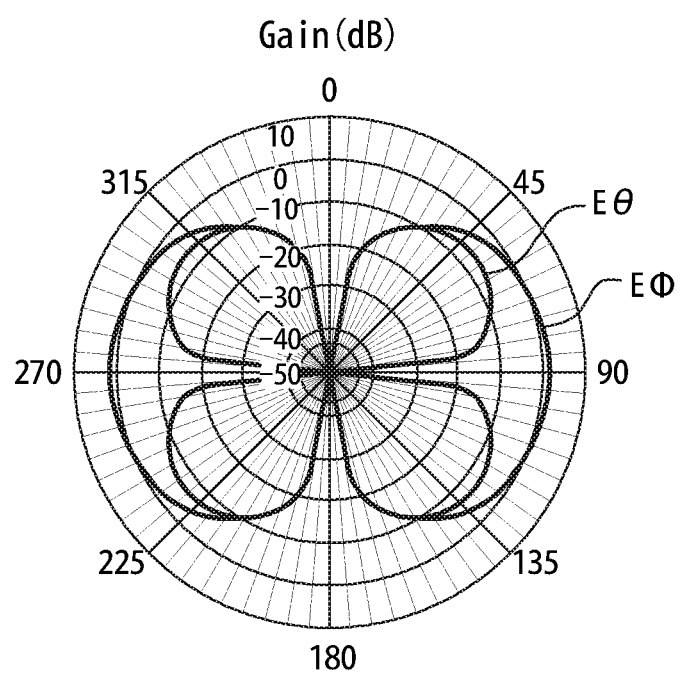

Each of FIG. 6A to FIG. 6C shows an example of far field radiation pattern. In this case, the far field radiation patterns for the (l, m) mode of the orbital angular momentum quantum number l and the magnetic quantum number m are shown. FIG. 6A, FIG. 6B and FIG. 6C show examples of a (1, 1) mode, a (2, 2) mode and a (3, 3) mode, respectively.

For the direction θ=0°, when the transmitting antenna and the receiving antenna are set in a direction opposite to each other, the electromagnetic wave is not radiated for the (2, 2) mode or the (3, 3) mode and the receiving antenna cannot receive at distant place.

However, because radiation intensity is hardly affected in a short distance even if the direction is different, the radiated electromagnetic wave can be received well by the circular loop antennas 210 to 240 when the distance between the transmitting antenna array 100 and the receiving antenna array 200 is relatively short.

Each of FIG. 7A to FIG. 7F is an example of return loss of each of the circular loop antennas 110 to 140 and 210 to 240 and a transmission characteristic between the antennas when the transmitting antenna array 100 and the receiving antenna array 200 are arranged as shown in FIG. 1.

The radii and conductor widths of the four circular loop antennas 110 to 140 or 210 to 240 of each antenna array 100 or 200 are set as follows:

Circular loop antenna 110, 210: radius of 8.7 mm and conductor width of 0.4 mm;
Circular loop antenna 120, 220: radius of 16.7 mm and conductor width of 0.4 mm;
Circular loop antenna 130, 230: radius of 25.0 mm and conductor width of 0.4 mm;
Circular loop antenna 140, 240: radius of 34.0 mm and conductor width of 0.8 mm.

Also, the conductors which configure the circular loop antennas 110 to 140 and 210 to 240 are arranged on a printed circuit board having the thickness of 0.1 mm and the relative dielectric constant of 4.7. Then, the transmitting antenna array 100 and the receiving antenna array 200 are arranged in the interval of 10 mm to oppose to each other. FIG. 7A to FIG. 7F show evaluation results. In this case, the orders of modes for the current and electromagnetic field correspond to n=1, 2, 3, 4. Also, the port impedance for the antenna at each of the feeding sections 111 to 141 and 211 to 214 is differential 200Ω by an impedance converting function of the balun.

Figure 7A:
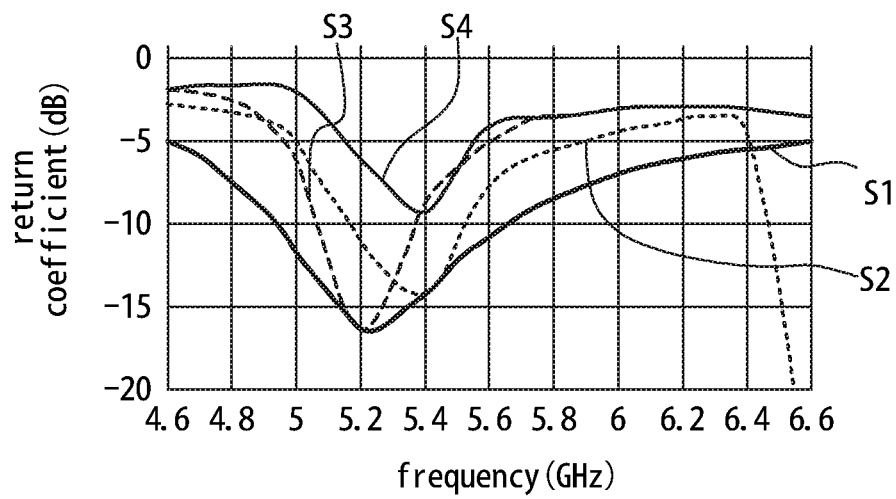
FIG. 7A, FIG. 7B, FIG. 7C, FIG. 7D, FIG. 7E and FIG. 7F are characteristic diagrams, and each of FIG. 7A to FIG. 7F shows an example of insertion loss between a transmitting side and a receiving side in an embodiment of the present invention.
Figure 7B:
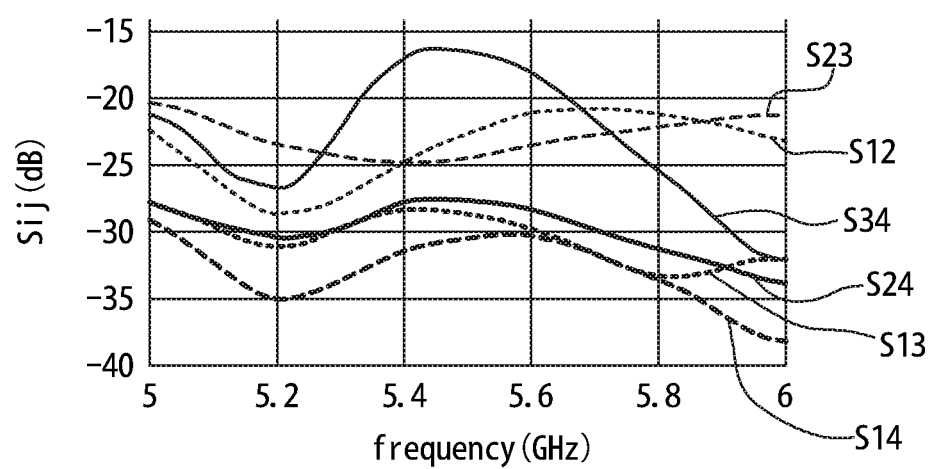
Figure 7C:
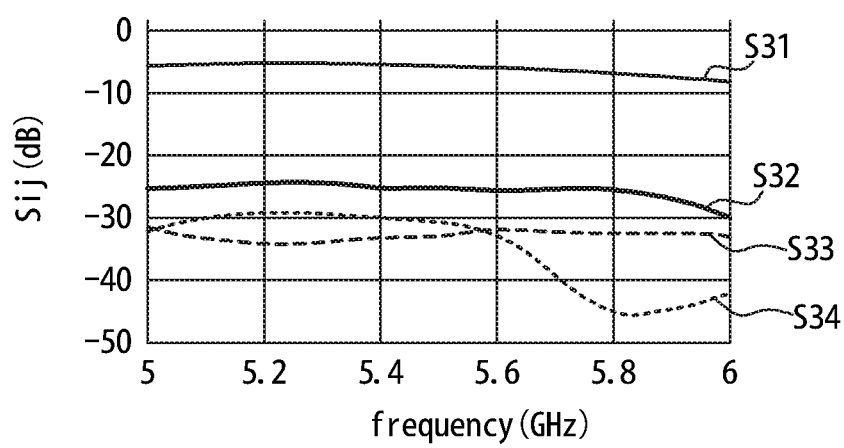
Figure 7D:
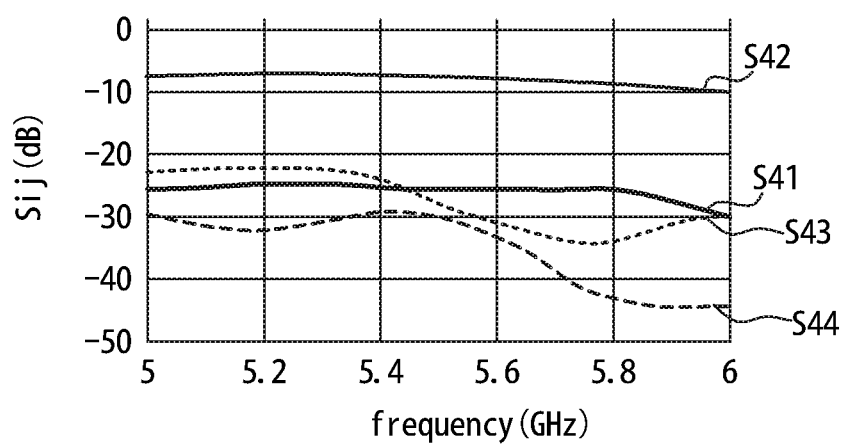
Figure 7E:
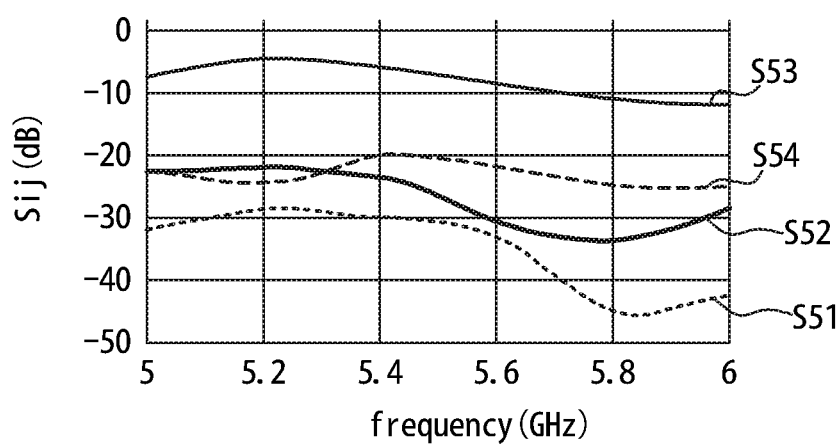
Figure 7F:
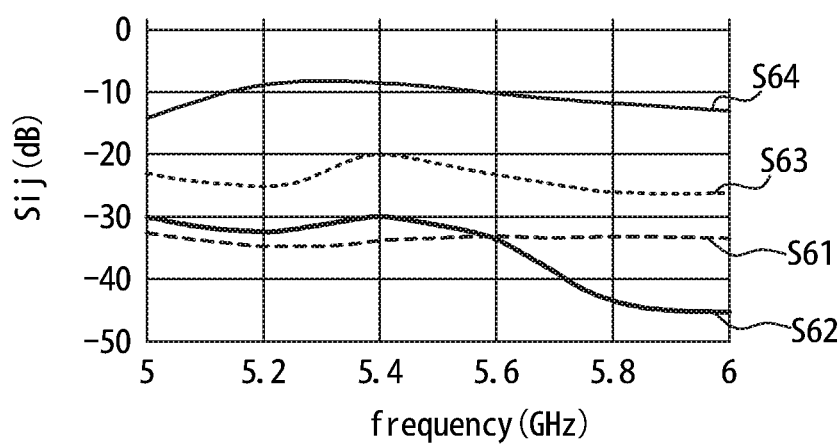

FIG. 7A shows return loss of the loop antenna, FIG. 7B shows mutual impedance of the loop antenna, FIG. 7C shows transmission between the feeding section 111 of the transmitting antenna array 100 and each of the feeding sections 211, 221, 231 and 241 of the receiving antenna array 200, FIG. 7D shows the transmission between the feeding section 121 of the transmitting antenna array 100 and each of the power feeding sections 211, 221, 231 and 241 of the receiving antenna array 200, FIG. 7E shows the transmission between the section 131 of the transmitting antenna array 100 and each of the feeding sections 211, 221, 231 and 241 of the receiving antenna array 200, and FIG. 7F shows the transmission between the feeding section 141 of the transmitting antenna array 100 and each of the feeding sections 211, 221, 231 and 241 of the receiving antenna array 200, respectively.

As for the return loss shown in FIG. 7A, the characteristic S1 shows the return loss of the circular loop antenna 110, 210, the characteristic S2 shows the return loss of the circular loop antenna 120, 220, the characteristic S3 shows the return loss of the circular loop antenna 130, 230, and the characteristic S4 shows the return loss of the circular loop antenna 140, 240. In FIG. 7A, the return loss in a range of 4.6 GHz to 6.6 GHz is shown.

FIG. 7A shows the good characteristics of return loss in a range of roughly 5.2 GHz to 5.4 GHz for the circular loop antenna having the loop perimeter of an integer multiple of one wavelength.

As for the mutual impedance shown in FIG. 7B, the characteristic S12 shows the mutual impedance of between the circular loop antennas 110 and 120, the characteristic S13 shows the mutual impedance between the circular loop antennas 110 and 130, the characteristic S14 shows the mutual impedance between the circular loop antennas 110 and 140, the characteristic S23 shows the mutual impedance between the circular loop antennas 120 and 130, the characteristic S24 shows the mutual impedance between the circular loop antennas 120 and 140, and the characteristic S34 shows the mutual impedance between the circular loop antennas 130 and 140. In FIG. 7B, the mutual impedance in a frequency range of 5 GHz to 6 GHz is shown.

As shown in FIG. 7B, the mutual impedance between the neighboring circular loop antennas which become a main factor of interference inside the transmitting array or the receiving array is small to be equal to or less than −17 dB in this frequency range, and the value is sufficiently small because of the difference of the magnetic quantum number mode due to difference of size.

Next, the transmissions for each antenna are shown in FIG. 7C to FIG. 7F. FIG. 7C to FIG. 7F show the transmissions in the frequency range of 5 GHz to 6 GHz.

FIG. 7C shows the transmissions between the feeding section 111 of the circular loop antenna 110 of the transmitting antenna array 100 and the feeding sections 211 to 241 of each of the circular loop antennas 210 to 240 of the receiving antenna array 200. The characteristic S31 shows the transmission between the section 111 and the section 211. The characteristic S32 shows transmission between the feeding section 111 and the feeding section 221. The characteristic S33 shows the transmission between the feeding section 111 and the feeding section 231. The characteristic S34 shows the transmission between feeding section 111 and the feeding section 241.

FIG. 7D shows the transmission between the feeding section 121 of the circular loop antenna 120 of the transmitting antenna array 100 and the feeding sections 211 to 241 of each of the circular loop antennas 210 to 240 of the receiving antenna array 200. The characteristic S41 shows the transmission between the feeding section 121 and the feeding section 211. The characteristic S42 shows the transmission between the feeding section 121 and the feeding section 221. The characteristic S43 shows the transmission between the feeding section 121 and the feeding section 231. The characteristic S44 shows the transmission between the feeding section 121 and the feeding section 241.

FIG. 7E shows the transmission between the feeding section 131 of the circular loop antenna 130 of the transmitting antenna array 100 and the feeding sections 211 to 241 of each of the circular loop antennas 210 to 240 of the receiving antenna array 200. The characteristic S51 shows the transmission between the feeding section 131 and the feeding section 211. The characteristic S52 shows the transmission between the feeding section 131 and the feeding section 221. The characteristic S53 shows the transmission between the feeding section 131 and the feeding section 231. The characteristic S54 shows the transmission between the feeding section 131 and the feeding section 241.

FIG. 7F shows the transmission between the feeding section 141 of the circular loop antenna 140 of the transmitting antenna array 100 and the feeding sections 211 to 241 of each of the circular loop antennas 210 to 240 of the receiving antenna array 200. The characteristic S61 shows the transmission between the feeding section 141 and the feeding section 211. The characteristic S62 shows the transmission between the feeding section 141 and the feeding section 221. The characteristic S63 shows the transmission between the feeding section 141 and the feeding section 231.

The characteristic S64 shows the transmission between the feeding section 141 and the feeding section 241.

As shown in FIG. 7C to FIG. 7F, the transmission characteristics S31, S42, S53 and S64 between the circular loop antennas having the same loop perimeter shows values enough to carry out a short-range wireless communication. For example, the transmission characteristic S31 of a transmission signal from the circular loop antenna 110 having the smallest radius shown in FIG. 7C is equal to or more than −6 dB and makes it possible to carry out wireless transmission well. On the other hand, the transmission characteristic in case of the circular loop antennas having different loop perimeters (e.g. characteristics S32, S33, and S34) is equal to or less than −20 dB, and is much smaller than the transmission in case of the circular loop antennas having the same loop perimeter. The small transmission may be neglected.

As described above, according to the system of the present example, the OAM waves can be radiated by the antenna apparatus with the simple configuration in which a plurality of circular loop antennas 110 to 140 and 210 to 240 are arranged, and in which phase shifters are not required unlike the conventional system. Thus, the quantity of transmission data can be increased in proportional to the number of circular loop antennas even in the single frequency band. Also, since each circular loop antenna selectively radiates and selectively receives the electromagnetic field of an approximately independent mode, each of the receiving sections 51 to 54 can receive only the data by demodulating a received signal by each circular loop antenna. Therefore, special processing is not required to separate the data from a plurality of antennas. Thus, the circuit configurations of the transmitting sections 21 to 24 and the receiving sections 51 to 54 become very simple.

[4. Configuration of Antenna Apparatus of Another Embodiment (Example in Which a Reflector is Arranged)]

Next, another embodiment of the present invention will be described.

Figure 8:
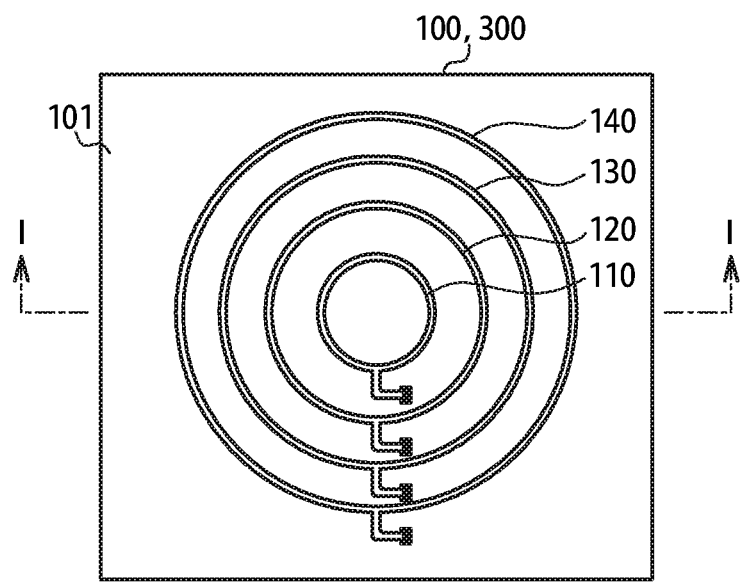
FIG. 8 is a plan showing an antenna configuration according to another embodiment of the present invention (in which a reflector is used).
Figure 9:
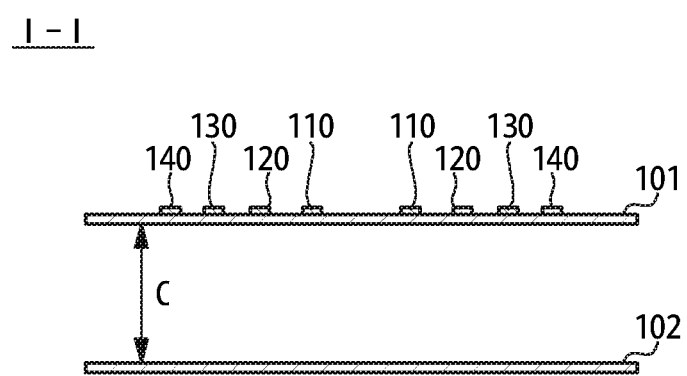
FIG. 9 is a cross-sectional view of the antenna configuration along I-I line in FIG. 8.

FIG. 8 and FIG. 9 show an example in which a reflector 102 is arranged for the transmitting antenna array 100. FIG. 8 is a plan view showing a substrate 101 on which the circular loop antennas 110 to 140 of the transmitting antenna array 100 are arranged. FIG. 9 is a cross-sectional view of transmitting antenna array 100 along I-I line in FIG. 8.

In the transmitting antenna array 100 of the present example, as shown in FIG. 8, the circular loop antennas 110 to 140 are arranged on the surface of the substrate 101. Then, the reflector 102 having the approximately same size as the substrate 101 and formed of a conductor is prepared. As shown in FIG. 9, the reflector 102 is arranged in the parallel to the substrate 101 to be apart from the substrate 101 by a distance c. In this case, the distance c is optionally set in a range of 1/20 to 1/4 of the wavelength λ of a wireless signal transmitted from the transmitting antenna array 100. An air layer is present between the substrate 101 and the reflector 102.

By arranging the reflector 102 as shown in FIG. 8 and FIG. 9, the electromagnetic wave radiated from each of the circular loop antennas 110 to 140 is reflected by the reflector 102, and propagates only to a direction opposite to the reflector 102 (upwardly in FIG. 9).

The reflector 102 shown in FIG. 9 may be arranged on the side of the receiving antenna array 200. In case of the receiving antenna array 200, the reflector 102 is arranged in a direction opposite to the incoming direction of the electromagnetic wave from the transmitting antenna array 100.

By arranging the reflectors 102 for both of the transmitting antenna array 100 and the receiving antenna array 200, the power which is radiated outside the transmitting antenna array 100 and the receiving antenna array 200 is confined between two antenna arrays 100 and 200, so that the received power by the receiving antenna array 200 increases.

[5. Configuration of Antenna Apparatus in Another Embodiment (Example of Arrangement of Paraboloid)]

Figure 10:
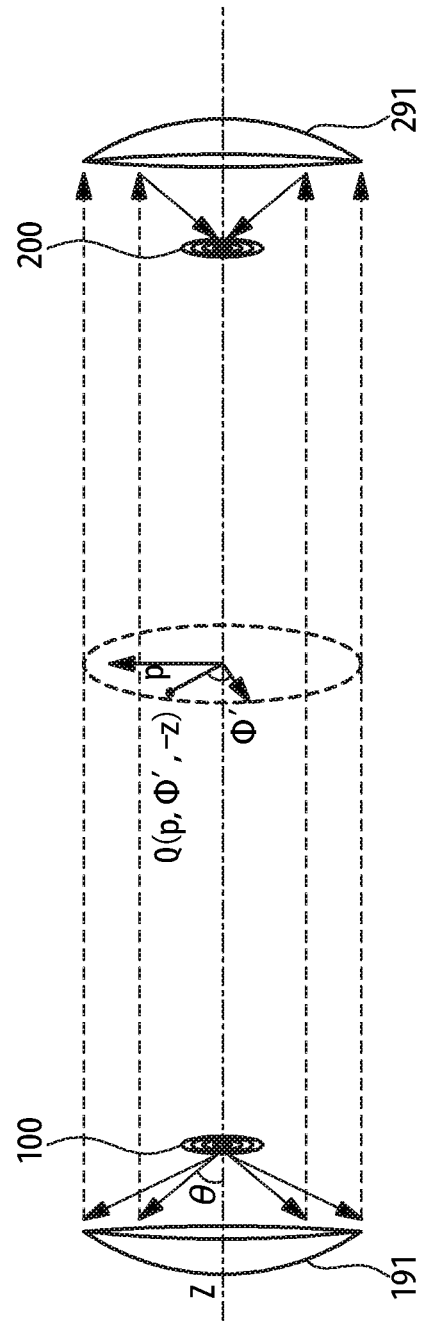
FIG. 10 is a diagram showing an antenna configuration according to another embodiment of the present invention (in which paraboloids are used).

FIG. 10 shows a configuration when paraboloids 191 and 291 are arranged for the transmitting antenna array 100 and the receiving antenna array 200.

In the present example, the paraboloids 191 and 291 having parabolic reflection surfaces are arranged outside the transmitting antenna array 100 and the receiving antenna array 200 which are arranged in a condition that the central axis coincides, to oppose to each other. Here, the central axes of the antenna arrays 100 and 200 and the central axes of the paraboloids 191 and 291 approximately coincides with each other, and the transmitting antenna array 100 and the receiving antenna array 200 are arranged around the focal point of the paraboloid 191 and around the focal point of the paraboloid 291, respectively, so that the antenna arrays 100 and 200 and the paraboloids 191 and 291 are arranged in line.

By configuring in this way, the electromagnetic wave radiated from each of the circular loop antennas 110 to 140 of the transmitting antenna array 100 has an electromagnetic field having an approximately single magnetic quantum number. This electromagnetic wave is reflected by the paraboloid 191 and the reflected wave is converted to have the wave front approximately perpendicular to the central axis.

A polar coordinate system (r, θ, φ) is set for a central position of the circular loop antennas 110 to 140 to be the origin as shown in FIG. 10, where Q point is expressed by (ρ, φ', −z) in the cylindrical coordinate system. The central axis is a straight line of θ=0 in the polar coordinate system, and is the Z axis in the cylindrical coordinate system.

In this case, the θ component of the electric field radiated from the circular loop antenna 110 to 140 is converted completely into the ρ component in the circular cylinder coordinate system in the reflection wave. The φ component of the electric field is converted completely into a φ' component in the circular cylinder coordinate system in the reflected wave by the paraboloid. Also, the intensity distribution of the electromagnetic field at the point Q on the surface which is perpendicular to the central axis is kept approximately identical to the position of the paraboloid 291 on the receiving side due to the reflection characteristic of the paraboloid 191.

As a result, contrary to the behavior at the transmitting side, in the electromagnetic field reflected by the paraboloid 291 on the receiver side, the ρ component of the electric field in the circular cylinder coordinate system is converted completely into the θ component of the polar coordinate system in the reflection wave, and the φ' component of the electric field is converted completely into the φ component in the polar coordinate system after the reflection by the paraboloid 291. As a result, only the direction of a wave number vector of the electromagnetic field is inverted, compared with the electromagnetic field on the transmitting side, and the field is input to the circular loop antennas 210 to 240 of the receiving antenna array 200. At this time, a phase change due to the propagation occurs but the phase change is uniform and may be neglected. Since this electromagnetic field excites the same current distribution except for the directions on the circular loop antennas 110 to 140 of the transmitting antenna array 100, each of the carrier wave with the transmitted signals is received just as it is by the circular loop antennas 210 to 240 of the receiving antenna array 200.

The reason can be explained as follows. Each of the circular loop antennas 110 to 140 radiates the electromagnetic field of the unique magnetic quantum number which is determined based on the radius ai of a conductor of the antenna on the transmitting side, while each of the circular loop antennas 210 to 240 receives exclusively the electromagnetic field of the unique magnetic quantum number determined based on the radius ai of the conductor of the antenna from the principle of the reciprocity in case of the reception. Therefore, the receiving antenna mainly receives the electromagnetic wave transmitted from the circular loop antenna with the same radius. That is, although the propagation space is the same, the carrier with the signal radiated from the circular loop antenna having the same radius is dominant, and is discriminated from the carrier with signals from the other circular loop antennas, because each of the circular loop antennas 110 to 140 and 210 to 240 transmits and receives dominantly the electromagnetic field (of the carrier) of the unique magnetic quantum number. In case of the configuration shown in FIG. 10 in which the paraboloids 191 and 291 are arranged, an electromagnetic field in a plane perpendicular to the central axis can be maintained up to a distant place by the paraboloid 191. Therefore, the distance between the transmitting antenna array 100 and the receiving antenna array 200 can be long, and the wireless communication for a relatively long distance becomes possible.

[6. Configuration of Antenna Apparatus of Another Embodiment (Example in Which Opening is Provided for Paraboloid)]

When the paraboloids 191 and 291 are arranged as shown in FIG. 10, an opening (a through-hole) may be provided at the center of each of the paraboloids 191 and 291 in accordance with the sizes of the transmitting antenna array 100 and the receiving antenna array 200.

Figure 11:
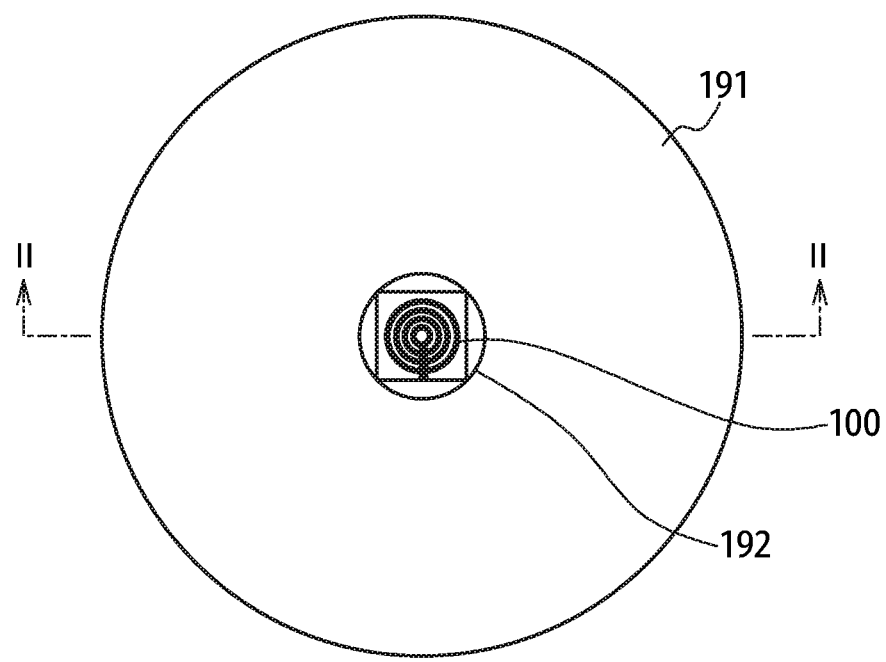
FIG. 11 is a plan view showing an antenna according to another embodiment of the present invention (in which an opening is provided in the paraboloid).
Figure 12:
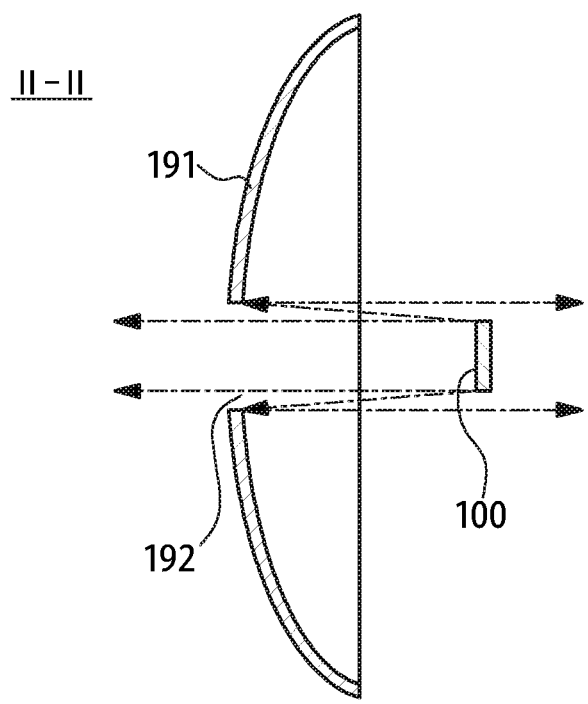
FIG. 12 is a cross-sectional view showing the antenna along II-II line in FIG. 11.

As shown in FIG. 11 and FIG. 12, an opening 192 is provided for the paraboloid 191. In this case, it is desirable that the opening 192 has the size which is equal to the size of the circular loop antenna 140 at the outermost circumference of the transmitting antenna array 100 or is slightly larger than it. FIG. 11 is a front view of the paraboloid 191 and the transmitting antenna array 100. FIG. 12 is a cross-sectional view of the paraboloid 191.

Although not illustrated, a similar opening is provided at the center of the paraboloid 291 on the receiving side.

In this way, by providing the opening 192 at the center of the paraboloid 191, the electromagnetic wave propagating in a front direction of the paraboloid 191, of the electromagnetic wave radiated from the transmitting antenna array 100 passes the opening 192 without being reflected by the paraboloid 191 so that it never reenter the transmitting antenna array 100. Generally, in the situation that the radiated electromagnetic field is input to the transmitting antenna (radiation body) again, the return loss characteristic and so on of the radiation body deteriorate. However, by employing this configuration, the change of the antenna characteristic can be reduced.

[7. Configuration of Antenna Apparatus of Another Embodiment (Example in Which Port Position is Shifted)]

Figure 13:
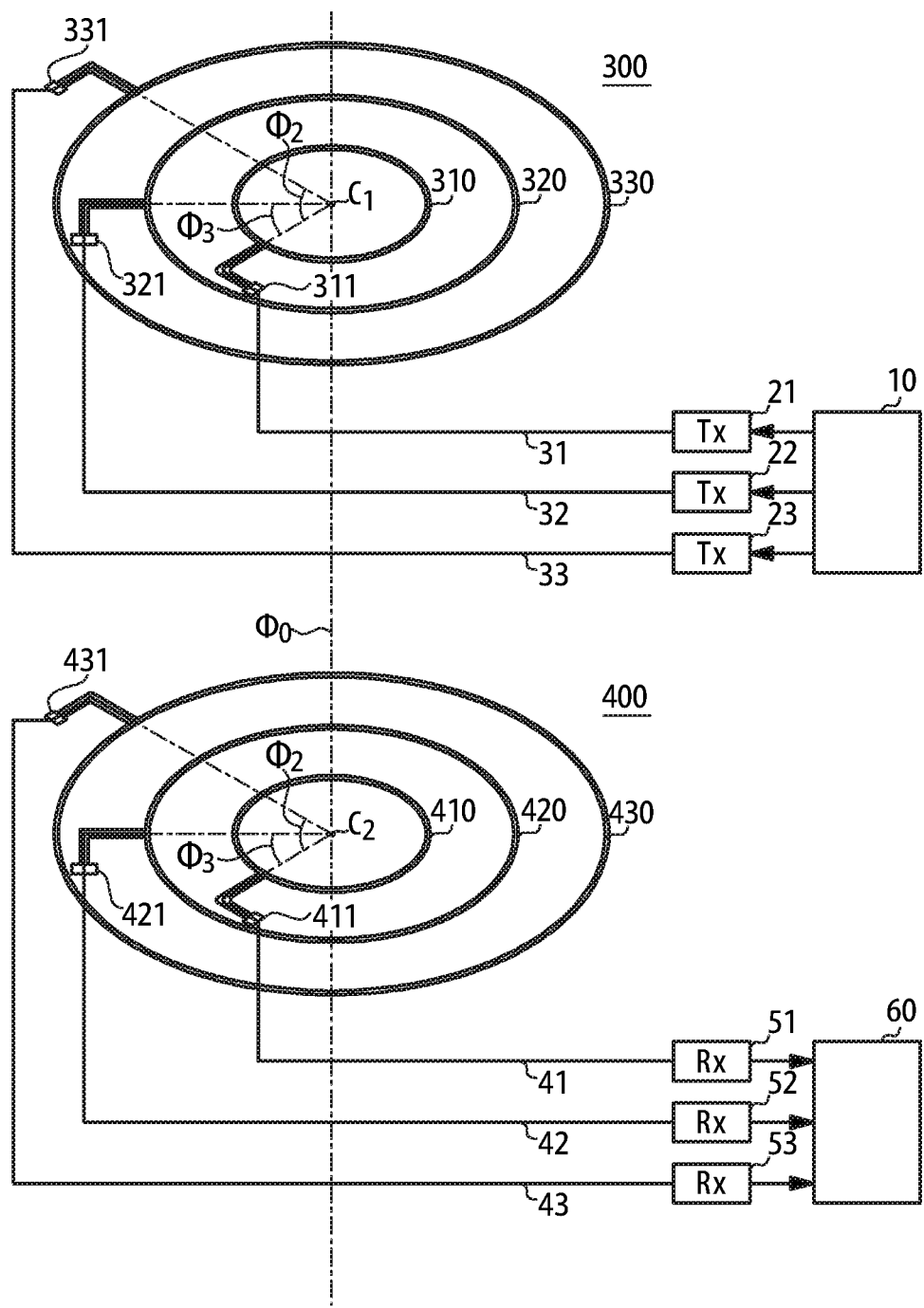
FIG. 13 is a diagram showing an antenna configuration according to another embodiment of the present invention (in which port directions are shifted).

FIG. 13 shows a configuration example of the wireless communication apparatus having the transmitting antenna array 300 and the receiving antenna array 400, in which port position is shifted.

The wireless communication apparatus shown in FIG. 13 is used for the wireless communication in a relatively short range between the transmitting antenna array 300 and the receiving antenna array 400. The transmitting antenna array 300 and the receiving antenna array 400 have an identical configuration, and each of them consists of a plurality of circular loop antennas 310 to 330 or 410 to 430 (three antennas).

That is, the transmitting antenna array 300 has three circular loop antennas 310, 320 and 330. The three circular loop antennas 310, 320 and 330 are arranged in an identical plane in a condition that the central positions $c_1$ are coincident with each other.

Also, the receiving antenna array 400 has three circular loop antennas 410, 420 and 430. The three circular loop antennas 410, 420 and 430 are arranged in an identical plane in a condition that the central positions $c_2$ are coincident with each other.

Each of the circular loop antennas 310 to 330 and 410 to 430 is formed from a circular conductor which is not connected to form a circle. This configuration is the same as the transmitting antenna array 100 and the receiving antenna array 200 in the example shown in FIG. 1.

The circular loop antennas 310 to 330 and 410 to 430 which configure the transmitting antenna array 300 and the receiving antenna array 400 have the loop perimeters approximately equal to the integral multiple of one wavelength determined from the frequency of the wireless communication. As for this point, the circular loop antennas 310 to 330 and 410 to 430 are the same as those of the transmitting antenna array 100 and the receiving antenna array 200 in the example shown in FIG. 1.

As shown in FIG. 13, the central axis $\phi_0$ extending in a direction orthogonal to the circular loop antennas 310 to 330 along the central position $c_1$ of the transmitting antenna array 300 passes the central position $c_2$ of the receiving antenna array 400. That is, the transmitting antenna array 300 and the receiving antenna array 400 are arranged with the approximately same central axis $\phi_0$.

A distance between the transmitting antenna array 300 and the receiving antenna array 400 is a relatively short distance from 0.5 cm to tens of cm.

In an example of FIG. 13, a data generating section 10 generates three kinds of transmission data sequences to supply to three transmitting sections 21, 22 and 23. Each of the transmitting sections 21, 22 and 23 modulates a carrier wave of a same frequency with one of the transmission data sequences, and generates transmission wave. The transmission waves converted by the transmitting sections 21, 22 and 23 are supplied to the feeding sections 311, 321 and 331 connected with the three circular loop antennas 310, 320 and 330 through signal lines 31, 32 and 33.

The feeding section 331 extending from the circular loop antenna 330 is provided at a position rotated by an angle $\phi_2$ around the central position $c_1$ from a position of the feeding section 311 extending from the circular loop antenna 310 of the transmitting antenna array 300. In the same way, the feeding section 321 extending from the circular loop antenna 320 is provided at a position rotated by an angle $\phi_3$ around the central position $c_1$ from the position of the feeding section 311. In this case, the angle $\phi_2$ is twice of the angle $\phi_3$. Here, the setting of twice is only an example, and no relation may exist between the two angles $\phi_2$ and $\phi_3$.

An angle $\phi_2$ between a position of the feeding section 411 extending from the circular loop antenna 410 of the receiving antenna array 400 and the position of the feeding section 431 extending from circular loop antenna 430 and an angle ϕ₃ between the position of the feeding section 411 and the position of the feeding section 421 extending from the circular loop antenna 420 are set to be equal to the angles ϕ₂ and ϕ₃ on the side of the transmitting antenna array 300. In other words, the circular loop antennas having the same size on the transmitting side and the receiving side are provided to have the positions of ports as the same angular positions and to oppose to each other. The position of port is defined as the position of the feeding section 311 to 331 and 411 to 431 extending from the circular loop antennas 310 to 330 and 410 to 430. That is, connection points between one end 110*a* and the other end 110*b* of the circular loop antenna 110 shown in FIG. 3 and the linear coupled lines 111*a* and 111*b* correspond to the position of a port.

The remaining configurations of the transmitting antenna array 300 and the receiving antenna array 400 are the same as those of the transmitting antenna array 100 and the receiving antenna array 200. Also, the detailed configuration of the feeding section 311 to 331 and 411 to 431 of the circular loop antennas 310 to 330 and 410 to 430 is the same as the feeding section 111 shown in FIG. 3.

Next, the operation will be described, when the transmitting antenna array 300 and the receiving antenna array 400 shown in FIG. 13 are used. In this case, the three circular loop antennas 310, 320 and 330 or 410, 420 and 430 on the transmitting side or the receiving side are referred to as antennas 1, 2 and 3 in the order of smaller loop radius.

A current distribution $I_i(\phi)$ on the antenna i (i=1,2,3) can be expanded as follows. Here, a subscript of $I_i^n$ shows an antenna number and the superscript shows an order of Fourier sequences expansion.

$$I_i(\phi) = I_i^0 + 2\sum_{n=1}^{\infty} I_i^n \cos(n\phi) \quad \text{Equation 7}$$

Slight transmission equal to or less than −20 dB exists between the antennas with different loop radii. To suppress this, it is necessary to consider according to the equation (7). In the equation (7), $I_i^n$ is uniquely defined when the configuration of the antenna is determined. However, complicated computation is required to determine this coefficient. Indeed, in case that the antenna 1 is stimulated, current is induced on the antennas 2 and 3, too. In the reception by the antenna 2, the power is determined based on the current and the port impedance at the port. Also, because the port position of the antenna 2 is at ϕ₂, the current $I_{p2}$ at the port is given as follows. Here, $I_2^n$ does not depend on the position of the port.

$$I_{p2} = I_2^0 + 2\sum_{n=1}^{\infty} I_2^n \cos(n\phi_2) \quad \text{Equation (8)}$$

Considering by using a generalized Y matrix for each order, $I_2^n$ undergoes an influence of the $n^{th}$ order induced voltage of the antennas 1 and 3. Therefore, the computation is very complicated. However, from a different viewpoint, it is considered that it suffices that a current is minimized when the port position ϕ₂ is varied. Because it is considered that the port current is made minimum at some port position when ϕ₂ is varied. It suffices that the transmission between the ports is evaluated for various ϕ₂, and find the minimum value. If the minimum value in this case is substantially reduced, the utility for the port position to be shifted as shown in FIG. 13, can be confirmed. In this case, because the maximum value of the transmission between the ports limits the communication performance, it is sufficient to minimize the maximum value.

Figure 14A:
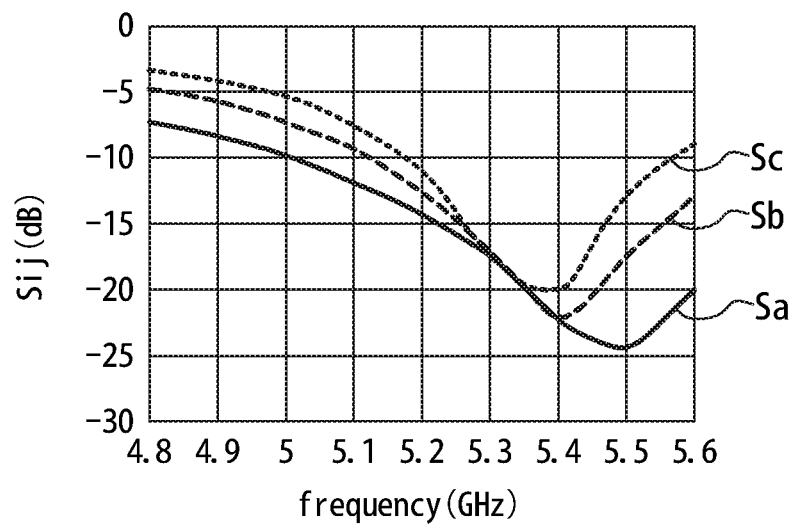
FIG. 14A and FIG. 14B are characteristic diagrams and FIG. 14A
Figure 14B:
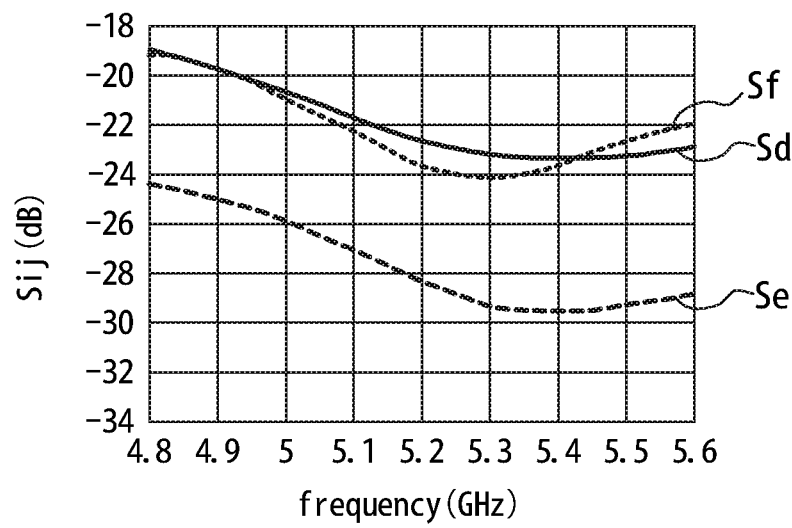

Each of FIG. 14A and FIG. 14B is characteristic diagram showing examples of the return loss (FIG. 14A) and the transmission (FIG. 14B) between the transmitting and receiving sides in case of the port positions in the same direction. That is, each of FIG. 14A and FIG. 14B shows the transmission when a port position is not shifted in the transmitting antenna array 300 and the receiving antenna array 400 (in other words, when being the same as the example of FIG. 1). In either case, the port impedance of the antenna is 200Ω.

Figure 15A:
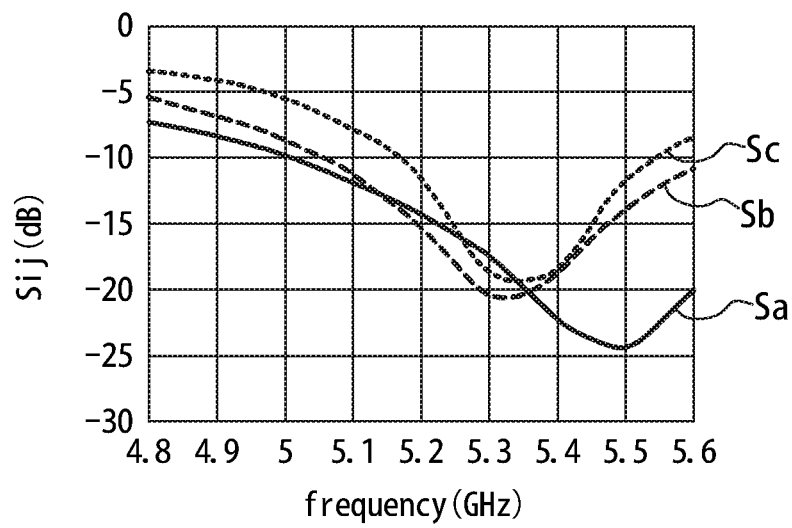
FIG. 15A and FIG. 15B are characteristic diagrams and FIG. 15A
Figure 15B:
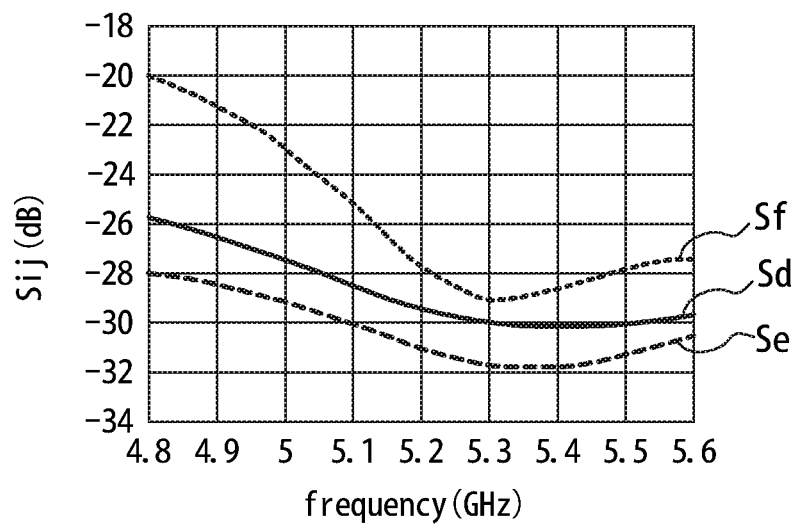

Each of FIG. 15A and FIG. 15B is a characteristic diagram showing an example of the return loss (FIG. 15A) and the transmission characteristic (FIG. 15B) when the port position is shifted as shown in FIG. 13.

The characteristics Sa in FIG. 14A and FIG. 15A show the return loss between the antenna 1 (circular loop antenna 310) of the transmitting antenna array 300 and the antenna 1 (circular loop antenna 410) of the receiving antenna array 400. Also, the characteristics Sb in FIG. 14A and FIG. 15A show the return loss of the antenna 2 (circular loop antenna 320) of the transmitting antenna array 300 and the antenna 2 (circular loop antenna 420) of the receiving antenna array 400. Moreover, the characteristics Sc in FIG. 14A and FIG. 15A show the return loss of the antenna 3 (circular loop antenna 330) of the transmitting antenna array 300 and the antenna 3 (circular loop antenna 430) of the receiving antenna array 400.

The characteristics Sd in FIG. 14B and FIG. 15B show the transmission characteristics between the antenna 1 (circular loop antenna 310) of the transmitting antenna array 300 and the antenna 2 (circular loop antenna 420) of the receiving antenna array 400. Also, the characteristics Se in FIG. 14B and FIG. 15B show the transmission between the antenna (circular loop antenna 310) of the transmitting antenna array 300 and the antenna 3 (circular loop antenna 430) of the receiving antenna array 400. Moreover, the characteristics Sf in FIG. 14B and FIG. 15B show the transmission between the antenna 2 (circular loop antenna 320) of the transmitting antenna array 300 and the antenna 3 (circular loop antenna 430) of the receiving antenna array 400.

As would been understood from the comparison of FIGS. 14A and 14B and FIGS. 15A and 15B, there is not a large difference in the return loss, even when a port arrangement is changed. On the other hand, when transmission characteristics are compared at 5.4-GHz in which good return loss is obtained, the characteristics Sd show −23.3 dB at the maximum for the identical port direction. On the other hand, the characteristics Sf show −28.5 dB for the shifted port directions shown in FIG. 13, and the transmission is suppressed by 5.2 dB. This is equivalent to the fact that an interference wave is suppressed by 5.2 dB and communication performance is substantially improved.

[8. Other Modification Example]

Note that the configurations in the embodiments having been described may be changed or modified in a range that the gist of the present invention is not changed.

For example, the number of circular loop antennas 110 to 140 and 210 to 240 to be arranged in the transmitting antenna array 100 and the receiving antenna array 200 is four in FIG. 1. However, the number of circular loop antennas 110 to 140 and 210 to 240 may be an optional number other than four according to the required transmission rate. The number of circular loop antennas 310 to 330 and 410 to 430 in the transmitting antenna array 300 and the receiving antenna array 400 when the port position is changed is also an example. A plurality of circular loop antennas other than three may be configured for the transmitting antenna array and the receiving antenna array according to the required transmission rate. In an example of the transmitting antenna array 300 and the receiving antenna array 400 when the port position is changed, it is sufficient to shift the port position of the circular loop antenna on each of the transmitting side and the receiving side.

Also, the loop perimeter of each circular loop antenna can be shortened when the effective dielectric constant is large. Moreover, by loading a lumped element such as an inductor to a port section, the circular loop antenna may be made smaller.

The configuration in which the reflector 102 shown in FIG. 8 and FIG. 9 is arranged and the configuration in which the paraboloids 191 and 291 shown in FIG. 10 to FIG. 12 are arranged may be combined. Also, the direction of the ports in a couple of transmitting and receiving loop antennas arranged between the two paraboloids may be rotated by 180 degrees. Furthermore, in the configuration in which the reflector 102 shown in FIG. 8 and FIG. 9 is arranged, and the configuration in which the paraboloids 191 and 291 shown in FIG. 10 to FIG. 12 are arranged, the configuration in which the port position shown in FIG. 13 is shifted may be combined.

In the configurations shown in FIG. 1 and FIG. 13, one is the transmitting antenna array 100 or 300 and the other is the receiving antenna array 200 or 400. However, since the transmitting antenna array 100 and 300 and the receiving antenna array 200 and 400 have the same configuration, a bidirectional wireless communication may be carried out by changing the transmitting side and the receiving side at any time.

Moreover, when carrying out the bidirectional wireless communication, a plurality of circular loop antennas arranged concentrically in a same plane are divided into two groups, and one group of circular loop antennas (e.g. the circular loop antennas 110 and 120 in FIG. 3) is used for the transmission and the other group of circular loop antennas (e.g. the circular loop antennas 130 and 140 in FIG. 3) is used for the reception. Thus, the transmission and the reception may be carried out at the same time by using the identical frequency.

EXPLANATION OF REFERENCE NUMERALS

10: data generating section
21 to 24: transmitting section
31 to 34 and 41 to 44: signal line
51 to 54: receiving section
60: data processing section
100, 300: transmitting antenna array
200, 400: receiving antenna array
101: antenna substrate
102: reflector
110, 120, 130 and 140: circular loop antenna
210, 220, 230 and 240: circular loop antenna
111, 121, 131 and 141: feeding section
211, 221, 231 and 241: feeding section
311, 321 and 331: feeding section
411, 421 and 431: feeding section
191, 291: paraboloid
192: opening

The invention claimed is:

1. A wireless communication apparatus comprising:
   a transmitting antenna array; and
   a receiving antenna array that receives wireless signals transmitted from the transmitting antenna array,
   wherein each of the transmitting antenna array and the receiving antenna array comprises:
   a plurality of circular loop antennas arranged concentrically in an identical plane, each of the plurality of circular loop antennas having a loop perimeter approximately equal to the integral multiple of one wavelength determined from a frequency for a wireless communication; and
   a plurality of feeding sections individually connected with the plurality of circular loop antennas, and
   wherein a central axis of the plurality of circular loop antennas of the transmitting antenna array and a central axis of the plurality of circular loop antennas of the receiving antenna array are arranged approximately on a straight line.

2. The wireless communication apparatus according to claim 1, wherein a plurality of transmitting sections are connected with the plurality of circular loop antennas of the transmitting antenna array, respectively,
   wherein a plurality of receiving sections are connected with the plurality of circular loop antennas of the receiving antenna array, respectively,
   wherein the plurality of transmitting sections supply the transmission signals as differential signals to one ends and the other ends of the plurality of circular loop antennas of the transmitting antenna array, and
   wherein the plurality of receiving sections receive the differential signals as reception signals from one ends and the other ends of the plurality of circular loop antennas of the receiving antenna array.

3. The wireless communication apparatus according to claim 1, further comprising:
   a reflector arranged to be separate from the plane, in which the plurality of circular loop antennas of the transmitting antenna array or the receiving antenna array are arranged, by a distance of ½₀ to ¼ of the wavelength, and to be parallel to the plane.

4. The wireless communication apparatus according to claim 1, wherein each of the transmitting antenna array and the receiving antenna array comprises a paraboloid having a parabolic reflection surface,
   wherein the plurality of circular loop antennas are arranged in a neighborhood of a focal position of the parabolic reflection surface of the paraboloid,
   wherein an electromagnetic wave transmitted from the plurality of circular loop antennas of the transmitting antenna array is reflected by the paraboloid of the transmitting antenna array to propagate for the receiving antenna, and
   wherein the propagated electromagnetic wave is reflected by the paraboloid of the receiving antenna to lead to the plurality of circular loop antennas of the receiving antenna array.

5. The wireless communication apparatus according to claim 4, wherein the paraboloid of each of the transmitting antenna array and the receiving antenna array further comprises an opening provided at a center section of the parabolic reflection surface of the paraboloid to have a size equal to or larger than a size of the outermost one of the plurality of circular loop antennas.

6. The wireless communication apparatus according to claim 1, wherein direction of the ports, connected with the feeding sections of the plurality of circular loop antennas of the transmitting antenna array are shifted for every circular loop antenna,
  wherein directions of the ports, connected with the feeding sections of the plurality of circular loop antennas of the receiving antenna array are shifted for every circular loop antenna, and
  wherein the ports, connected with the feeding section of the circular loop antenna with a loop radius of the transmitting antenna array and the ports, connected with the feeding section of the circular loop antenna with the same loop radius of the receiving antenna array are arranged at a same direction to oppose to each other.

* * * * *